US011758601B2

(12) United States Patent
Akl et al.

(10) Patent No.: US 11,758,601 B2
(45) Date of Patent: Sep. 12, 2023

(54) USER-PLANE TRAFFIC ROUTING IN INTEGRATED ACCESS AND BACKHAUL DEPLOYMENTS

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 17/302,900

(22) Filed: May 14, 2021

(65) Prior Publication Data
US 2022/0369398 A1 Nov. 17, 2022

(51) Int. Cl.
*H04W 76/15* (2018.01)
*H04W 76/12* (2018.01)
(Continued)

(52) U.S. Cl.
CPC ........... *H04W 76/15* (2018.02); *H04W 24/02* (2013.01); *H04W 28/0808* (2020.05);
(Continued)

(58) Field of Classification Search
CPC ..... H04W 76/15; H04W 76/12; H04W 24/02; H04W 28/0808; H04W 28/0917;
(Continued)

(56) References Cited

U.S. PATENT DOCUMENTS

2021/0227435 A1* 7/2021 Hsieh ................. H04W 36/08
2021/0259051 A1* 8/2021 Latheef ............... H04W 88/085
(Continued)

OTHER PUBLICATIONS

3GPP TR 38.874: "3rd Generation Partnership Project, Technical Specification Group Radio Access Network, Study on Integrated Access and Backhaul (Release 15)", TR 38.874 V0.7.0—Final—CLN, 3rd Generation Partnership Project, Mobile Competence Centre, 650, Route Des Lucioles, F-06921, Sophia-Antipolis Cedex, France, Nov. 8, 2018 (Nov. 8, 2018), XP051591963, Nov. 28, 2018 (Nov. 28, 2018), pp. 1-111.
(Continued)

*Primary Examiner* — Robert C Scheibel
(74) *Attorney, Agent, or Firm* — QUALCOMM Incorporated

(57) ABSTRACT

Various aspects of the present disclosure generally relate to wireless communication. In some aspects, a wireless node may establish a first connection between a child wireless node and a first base station and a second connection between the child wireless node and a second base station, wherein the first connection is an F1-U direct path and the second connection is an F1-U alternative path. The wireless node may forward at least a portion of user-plane traffic between the child wireless node and the first base station via the second connection and the second base station. Numerous other aspects are described.

30 Claims, 12 Drawing Sheets

(51) Int. Cl.
*H04W 28/08* (2023.01)
*H04W 28/086* (2023.01)
*H04W 24/02* (2009.01)
*H04W 36/08* (2009.01)

(52) U.S. Cl.
CPC ....... *H04W 28/0917* (2020.05); *H04W 36/08* (2013.01); *H04W 76/12* (2018.02)

(58) Field of Classification Search
CPC ..... H04W 36/08; H04W 28/08; H04W 40/22; H04L 45/22; H04L 47/125
See application file for complete search history.

(56) References Cited

U.S. PATENT DOCUMENTS

2021/0315030 A1* 10/2021 Teyeb ................ H04L 61/5076
2022/0086935 A1* 3/2022 Byun ................ H04W 74/0833
2022/0151006 A1* 5/2022 Muhammad ............ H04L 45/28
2022/0201777 A1* 6/2022 Teyeb .................. H04W 76/20

OTHER PUBLICATIONS

International Search Report and Written Opinion—PCT/US2022/071031—ISA/EPO—dated May 17, 2022.
Samsung: "Discussion on Inter-Donor Topology Redundancy for IAB", 3GPP TSG-RAN WG3#110-e, R3-206002, 3rd Generation Partnership Project, Mobile Competence Centre, 650, Route Des Lucioles, F-06921 Sophia-Antipolis Cedex, France, vol. RAN WG3, No. Online, Nov. 2, 2020-Nov. 12, 2020, Oct. 23, 2020, XP051945593, 4 Pages.
Samsung (Moderator): "Summary of Offline Discussion on Topology Redundancy", 3GPP TSG-RAN WG3 #111-e, R3-211202, 3rd Generation Partnership Project, Mobile Competence Centre, 650, Route Des Lucioles, F-06921 Sophia-Antipolis Cedex, France, vol. RAN WG3, No. Online, Jan. 25, 2021-Feb. 4, 2021, 38 Pages, Feb. 5, 2021, XP051978486.

* cited by examiner

USER-PLANE TRAFFIC ROUTING IN INTEGRATED ACCESS AND BACKHAUL DEPLOYMENTS

FIELD OF THE DISCLOSURE

Aspects of the present disclosure generally relate to wireless communication and to techniques and apparatuses for user-plane traffic routing in integrated access and backhaul deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a wireless node for wireless communication includes a memory; and one or more processors, coupled to the memory, configured to: establish a first connection between a child wireless node and a first base station and a second connection between the child wireless node and the first base station via a second base station, wherein the first connection is an F1-U direct path and the second connection is an F1-U alternative path; and forward at least a portion of user-plane traffic between the child wireless node and the first base station via the second connection and the second base station.

In some aspects, a first base station for wireless communication includes a memory; and one or more processors, coupled to the memory, configured to: establish a first connection to a child wireless node via a wireless node and a second connection to the child wireless node via a second base station and the wireless node, wherein the first connection is an F1-U direct path and the second connection is an F1-U alternative path; and communicate at least a portion of user-plane traffic with the child wireless node via the second connection, the wireless node, and the second base station.

In some aspects, a second base station for wireless communication includes a memory; and one or more processors, coupled to the memory, configured to: establish a second connection between a first base station and a child wireless node via a wireless node, wherein the child wireless node is associated with a first connection to the first base station via the wireless node, and wherein the first connection is an F1-U direct path and the second connection is an F1-U alternative path; and forward at least a portion of user-plane traffic between the first base station and the child wireless node via the second connection and the wireless node.

In some aspects, a non-transitory computer-readable medium storing a set of instructions for wireless communication includes one or more instructions that, when executed by one or more processors of a wireless node, cause the wireless node to: establish a first connection between a child wireless node and a first base station and a second connection between the child wireless node and the first base station via a second base station, wherein the first connection is an F1-U direct path and the second connection is an F1-U alternative path; and forward at least a portion of user-plane traffic between the child wireless node and the first base station via the second connection and the second base station.

In some aspects, a non-transitory computer-readable medium storing a set of instructions for wireless communication includes one or more instructions that, when executed by one or more processors of a first base station, cause the first base station to: establish a first connection to a child wireless node via a wireless node and a second connection to the child wireless node via a second base station and the wireless node, wherein the first connection is an F1-U direct path and the second connection is an F1-U alternative path; and communicate at least a portion of user-plane traffic with the child wireless node via the second connection, the wireless node, and the second base station.

In some aspects, a non-transitory computer-readable medium storing a set of instructions for wireless communication includes one or more instructions that, when executed by one or more processors of a second base station, cause the second base station to: establish a second connection between a first base station and a child wireless node via a wireless node, wherein the child wireless node is associated with a first connection to the first base station via the wireless node, and wherein the first connection is an F1-U direct path and the second connection is an F1-U alternative path; and forward at least a portion of user-plane traffic between the first base station and the child wireless node via the second connection and the wireless node.

In some aspects, an apparatus for wireless communication includes means for establishing a first connection between a child wireless node and a first base station and a second connection between the child wireless node and the first base station via a second base station, wherein the first connection is an F1-U direct path and the second connection is an F1-U alternative path; and means for forwarding at least a portion of user-plane traffic between the child wireless node and the first base station via the second connection and the second base station.

In some aspects, an apparatus for wireless communication includes means for establishing a first connection to a child wireless node via a wireless node and a second connection to the child wireless node via a second base station and the wireless node, wherein the first connection is an F1-U direct path and the second connection is an F1-U alternative path; and means for communicating at least a portion of user-plane traffic with the child wireless node via the second connection, the wireless node, and the second base station.

In some aspects, an apparatus for wireless communication includes means for establishing a second connection between a first base station and a child wireless node via a wireless node, wherein the child wireless node is associated with a first connection to the first base station via the wireless node, and wherein the first connection is an F1-U direct path and the second connection is an F1-U alternative path; and means for forwarding at least a portion of user-plane traffic between the first base station and the child wireless node via the second connection and the wireless node.

In some aspects, a method of wireless communication performed by a wireless node includes establishing a first connection between a child wireless node and a first base station and a second connection between the child wireless node and the first base station via a second base station, wherein the first connection is an F1-U direct path and the second connection is an F1-U alternative path; and forwarding at least a portion of user-plane traffic between the child wireless node and the first base station via the second connection and the second base station.

In some aspects, a method of wireless communication performed by a first base station includes establishing a first connection to a child wireless node via a wireless node and a second connection to the child wireless node via a second base station and the wireless node, wherein the first connection is an F1-U direct path and the second connection is an F1-U alternative path; and communicating at least a portion of user-plane traffic with the child wireless node via the second connection, the wireless node, and the second base station.

In some aspects, a method of wireless communication performed by a second base station includes establishing a second connection between a first base station and a child wireless node via a wireless node, wherein the child wireless node is associated with a first connection to the first base station via the wireless node, and wherein the first connection is an F1-U direct path and the second connection is an F1-U alternative path; and forwarding at least a portion of user-plane traffic between the first base station and the child wireless node via the second connection and the wireless node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
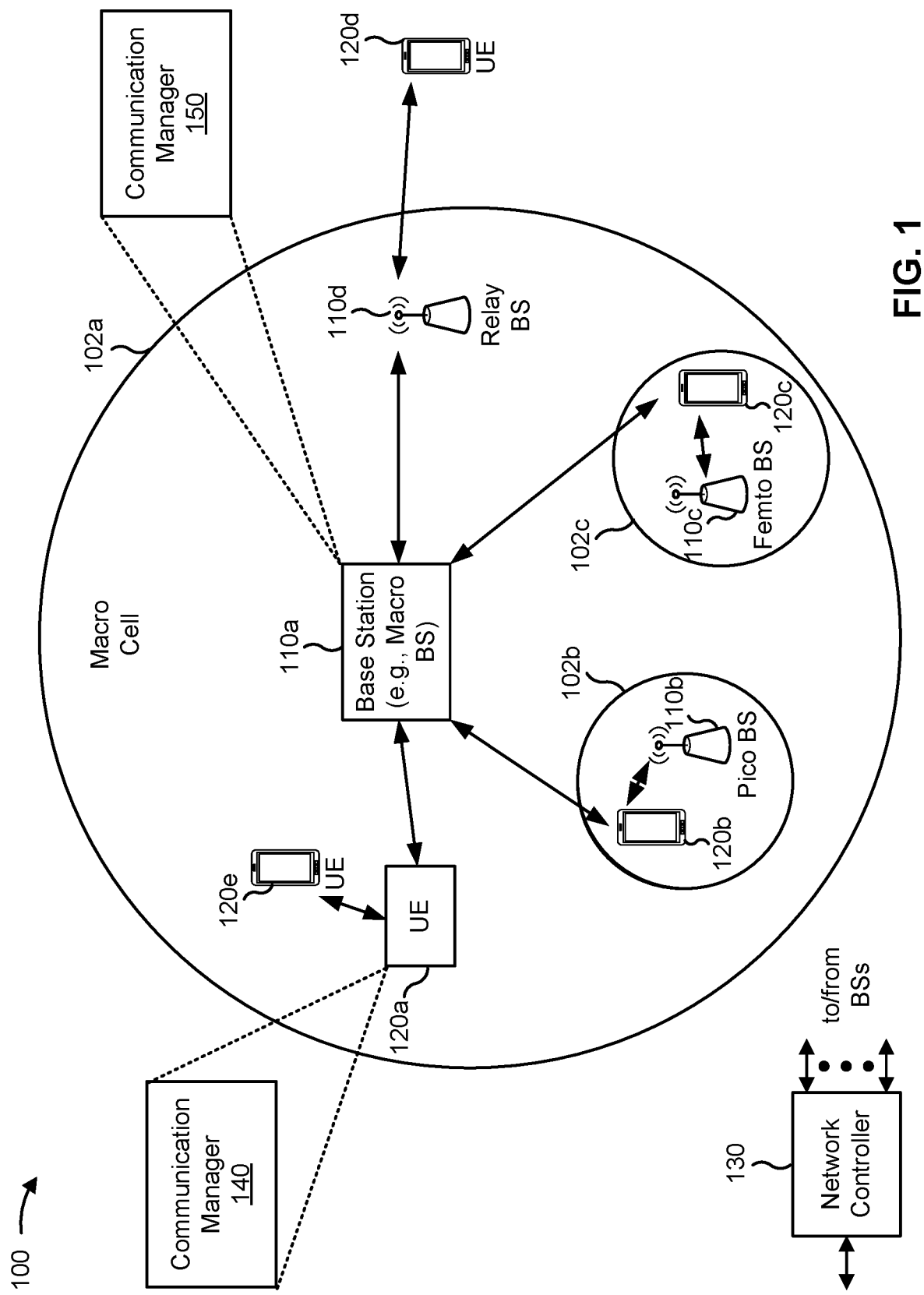
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" or "sub-6" band. Similarly, FR2 is often referred to as a "millimeter wave" or "mmWave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a wireless node may include a communication manager 140 or 150. As described in more detail elsewhere herein, the communication manager 140 or 150 may establish a first connection between a child wireless node and a first base station and a second connection between the child wireless node and the first base station via a second base station, wherein the first connection is an F1-U direct path and the second connection is an F1-U alternative path; and forward at least a portion of user-plane traffic between the child wireless node and the first base station via the second connection and the second base station. Additionally, or alternatively, the communication manager 140 or 150 may perform one or more other operations described herein.

In some aspects, the base station 110 may include a communication manager 150. As described in more detail elsewhere herein, the communication manager 150 may establish a first connection to a child wireless node via a wireless node and a second connection to the child wireless node via a second base station and the wireless node, wherein the first connection is an F1-U direct path and the second connection is an F1-U alternative path; and communicate at least a portion of user-plane traffic with the child wireless node via the second connection, the wireless node, and the second base station. The communication manager 150 may establish a second connection between a first base station and a child wireless node via a wireless node, wherein the child wireless node is associated with a first connection to the first base station via the wireless node, and wherein the first connection is an F1-U direct path and the second connection is an F1-U alternative path; and forward at least a portion of user-plane traffic between the first base station and the child wireless node via the second connection and the wireless node. Additionally, or alternatively, the communication manager 150 may perform one or more other operations described herein.

As indicated above, FIG. 1 is provided as an example. Other examples may differ from what is described with regard to FIG. 1.

Figure 2:
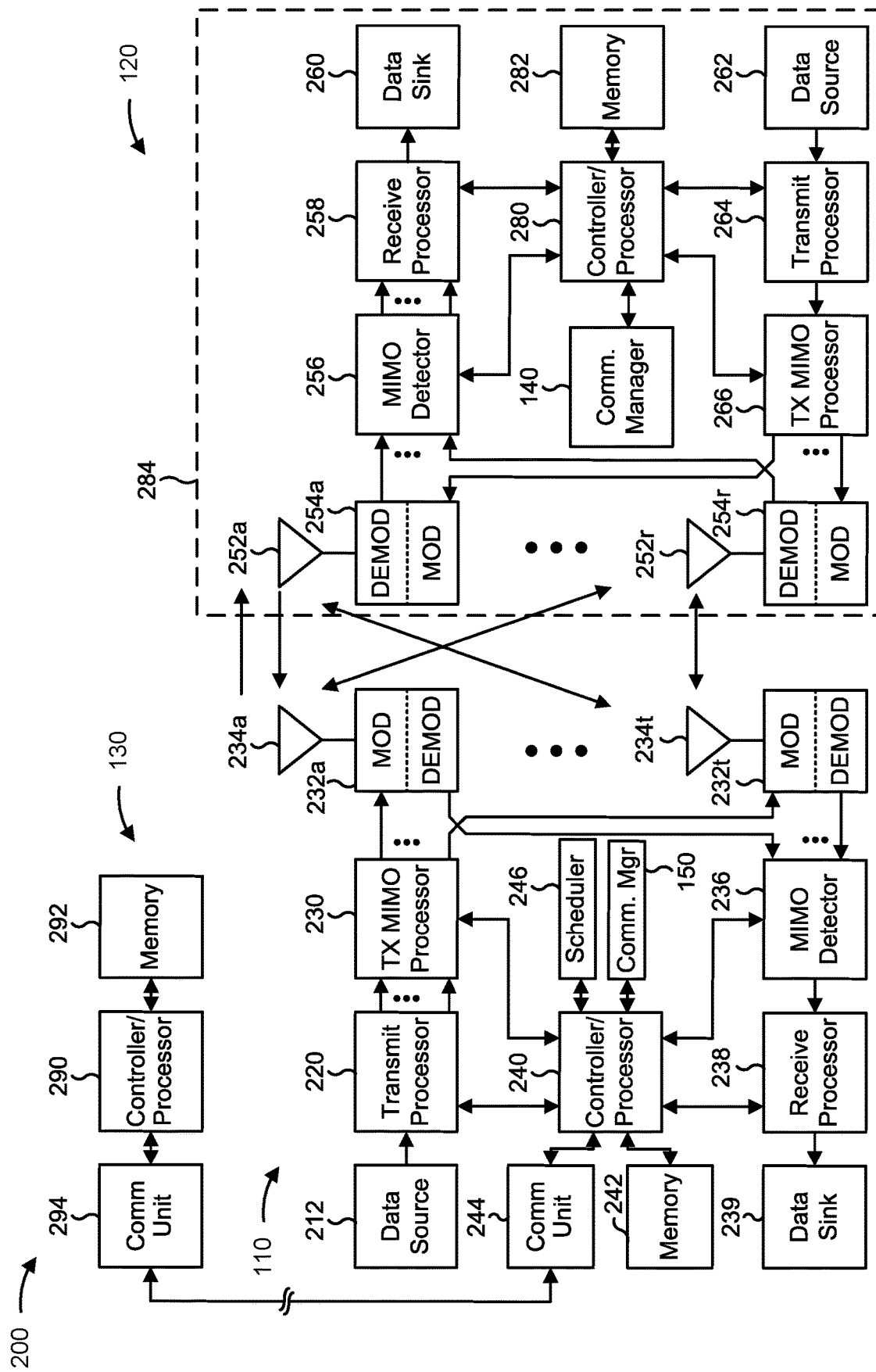
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-10). Controller/processor 240 of base station 110, controller/processor 280 of UE 120, and/or any other component(s) of FIG. 2 may perform one or more techniques associated with user-plane traffic routing in integrated access and backhaul deployments, as described in more detail elsewhere herein. In some aspects, the wireless nodes described herein may be the base station 110 or UE 120, may be included in the base station 110 or UE 120, or may include one or more components of the base station 110 or UE 120 shown in FIG. 2.

Figure 8:
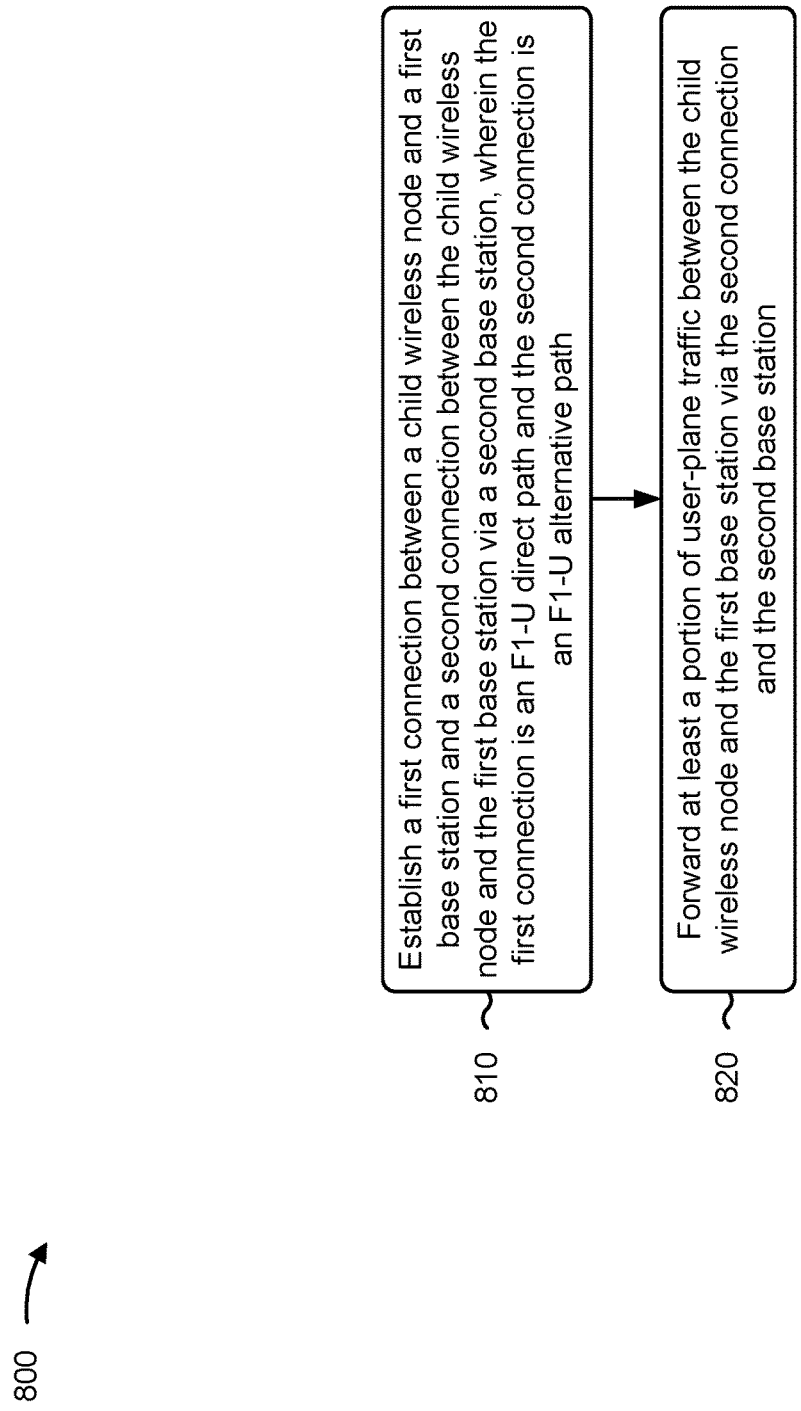
FIGS. 8-10 are diagrams illustrating example processes associated with user-plane traffic routing in IAB deployments, in accordance with the present disclosure.
Figure 9:
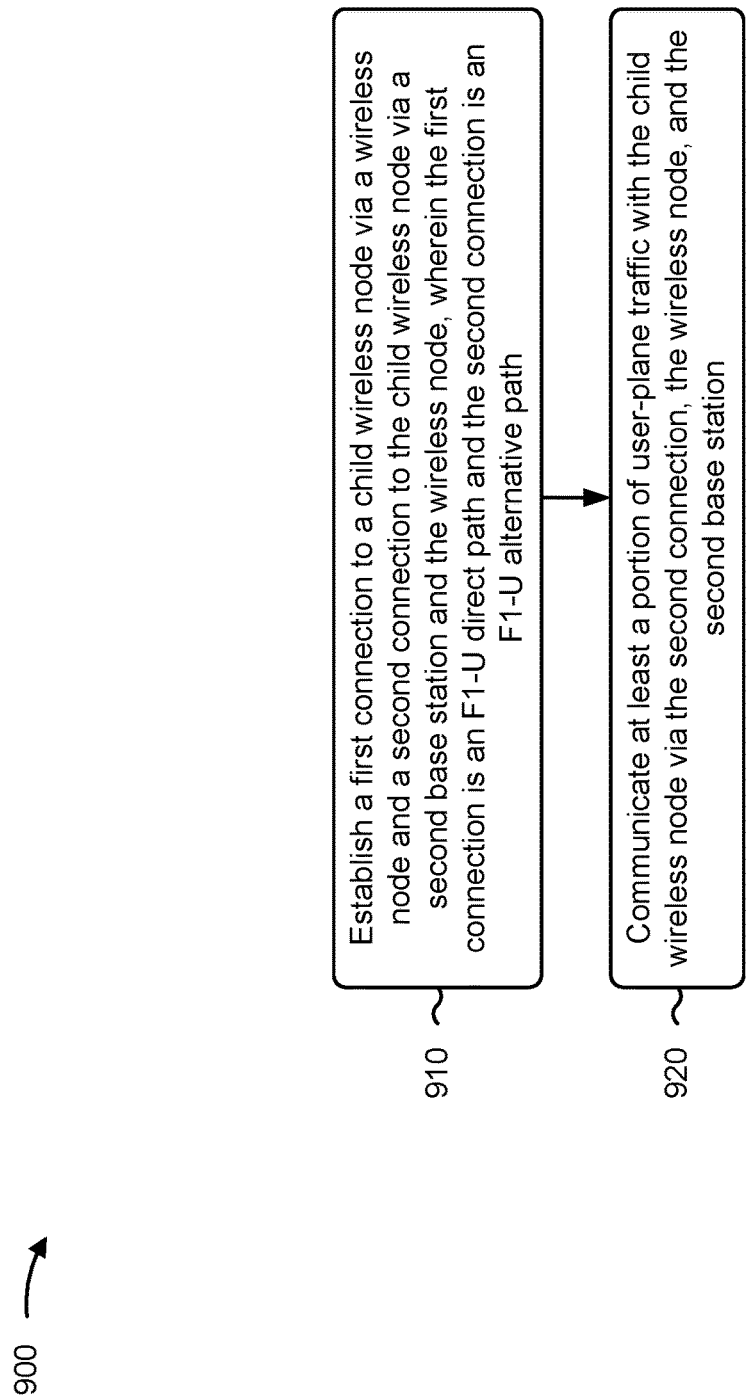
Figure 10:
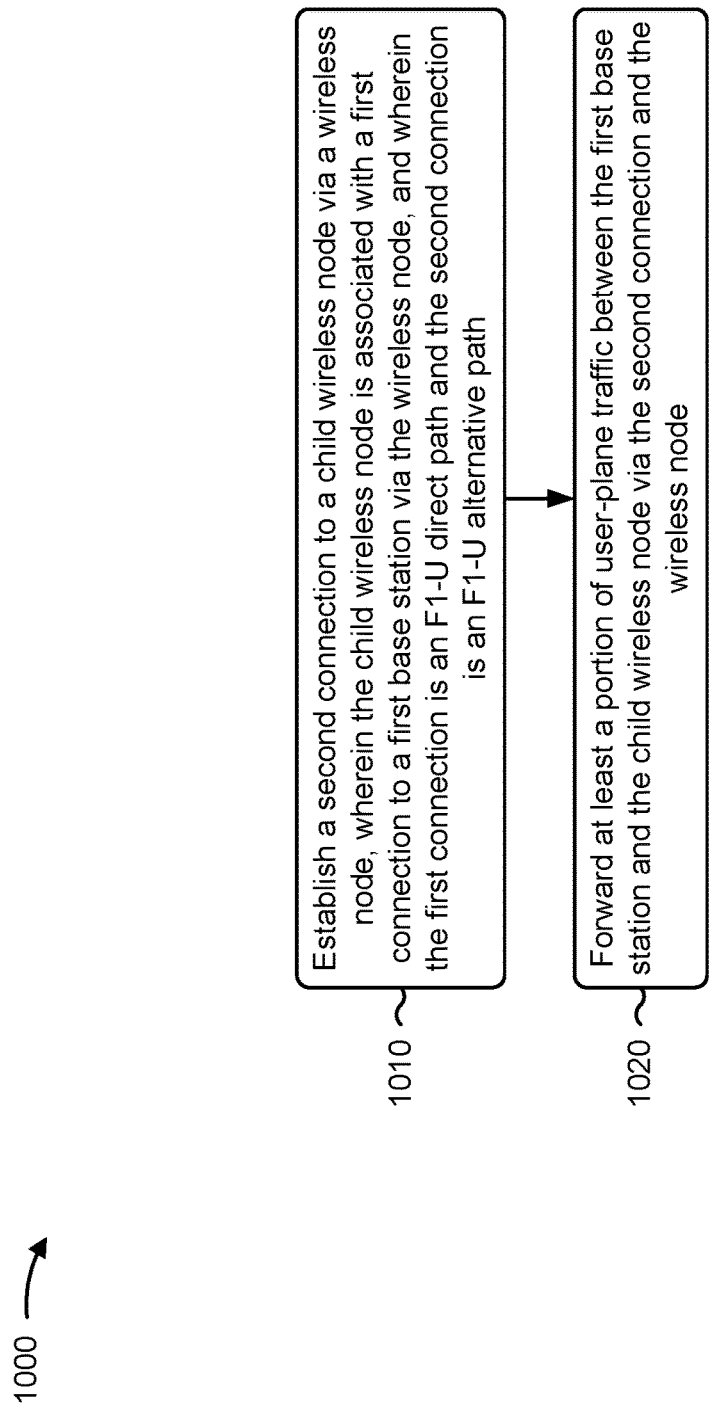

For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the wireless node includes means for establishing a first connection between a child wireless node and a first base station and a second connection between the child wireless node and the first base station via a second base station, wherein the first connection is an F1-U direct path and the second connection is an F1-U alternative path; and/or means for forwarding at least a portion of user-plane traffic between the child wireless node and the first base station via the second connection and the second base station. In some aspects, the means for the wireless node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the first base station includes means for establishing a first connection to a child wireless node via a wireless node and a second connection to the child wireless node via a second base station and the wireless node, wherein the first connection is an F1-U direct path and the second connection is an F1-U alternative path; and/or means for communicating at least a portion of user-plane traffic with the child wireless node via the second connection, the wireless node, and the second base station. The means for the first base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the second base station includes means for establishing a second connection between a first base station and a child wireless node via a wireless node, wherein the child wireless node is associated with a first connection to the first base station via the wireless node, and wherein the first connection is an F1-U direct path and the second connection is an F1-U alternative path; and/or means for forwarding at least a portion of user-plane traffic between the first base station and the child wireless node via the second connection and the wireless node. The means for the second base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
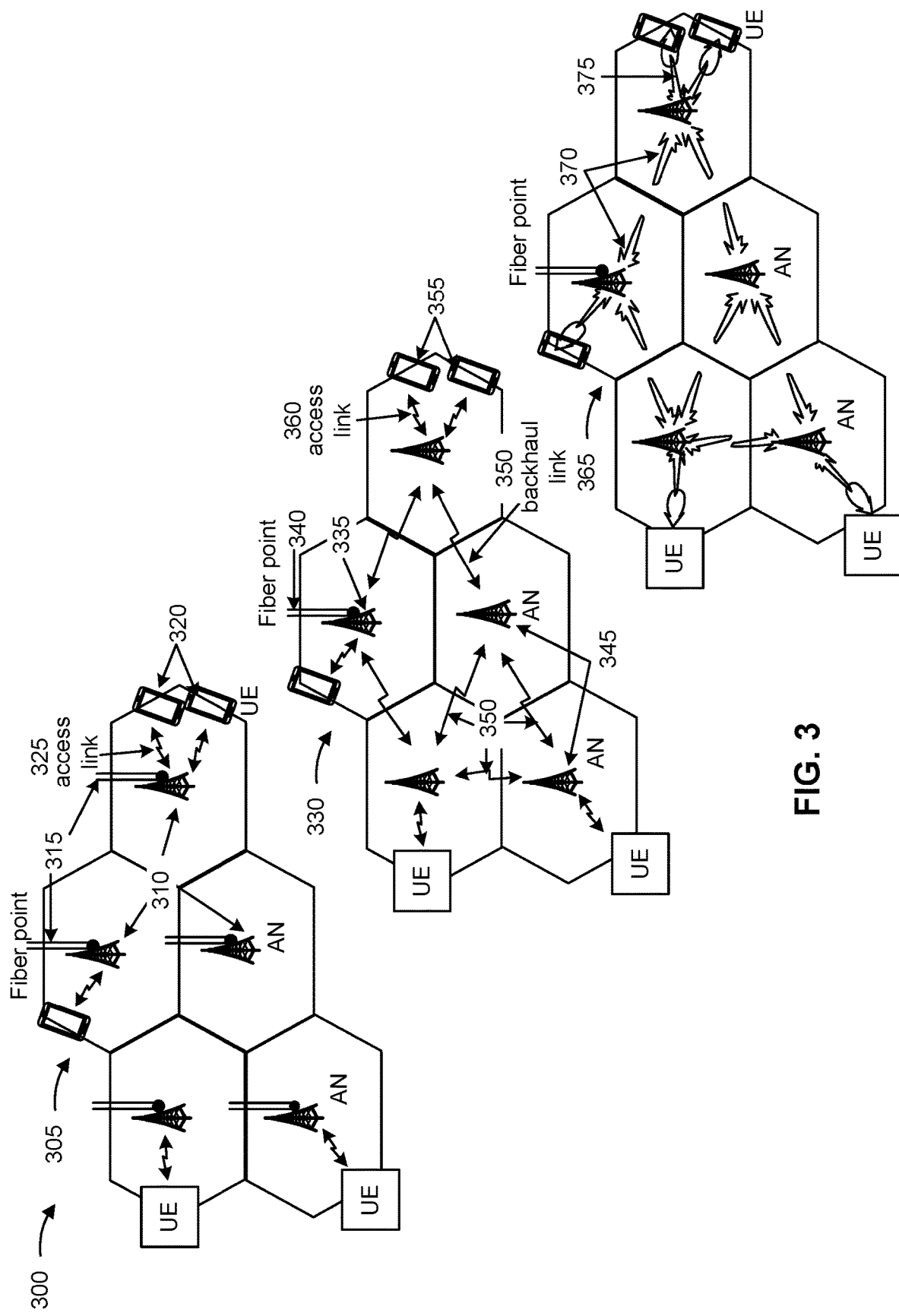
FIG. 3 is a diagram illustrating an example of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station). Additionally, or alternatively, the BSs and UEs in FIG. 3 may be a set of wireless nodes. For example, an IAB-donor may be a base station with a connection to a core network and may include a central unit (CU) and a distributed unit (DU). The DU may connect to a first IAB node, which may further connect to a second IAB node (which may be a child wireless node of the first IAB node). In some cases, a particular destination wireless node, such as a UE, may connect to a particular source wireless node, such as an IAB donor-CU, via a plurality of possible topological links (e.g., via a plurality of different possible links between wireless nodes).

As indicated above, FIG. 3 is provided as an example. Other examples may differ from what is described with regard to FIG. 3.

Figure 4:
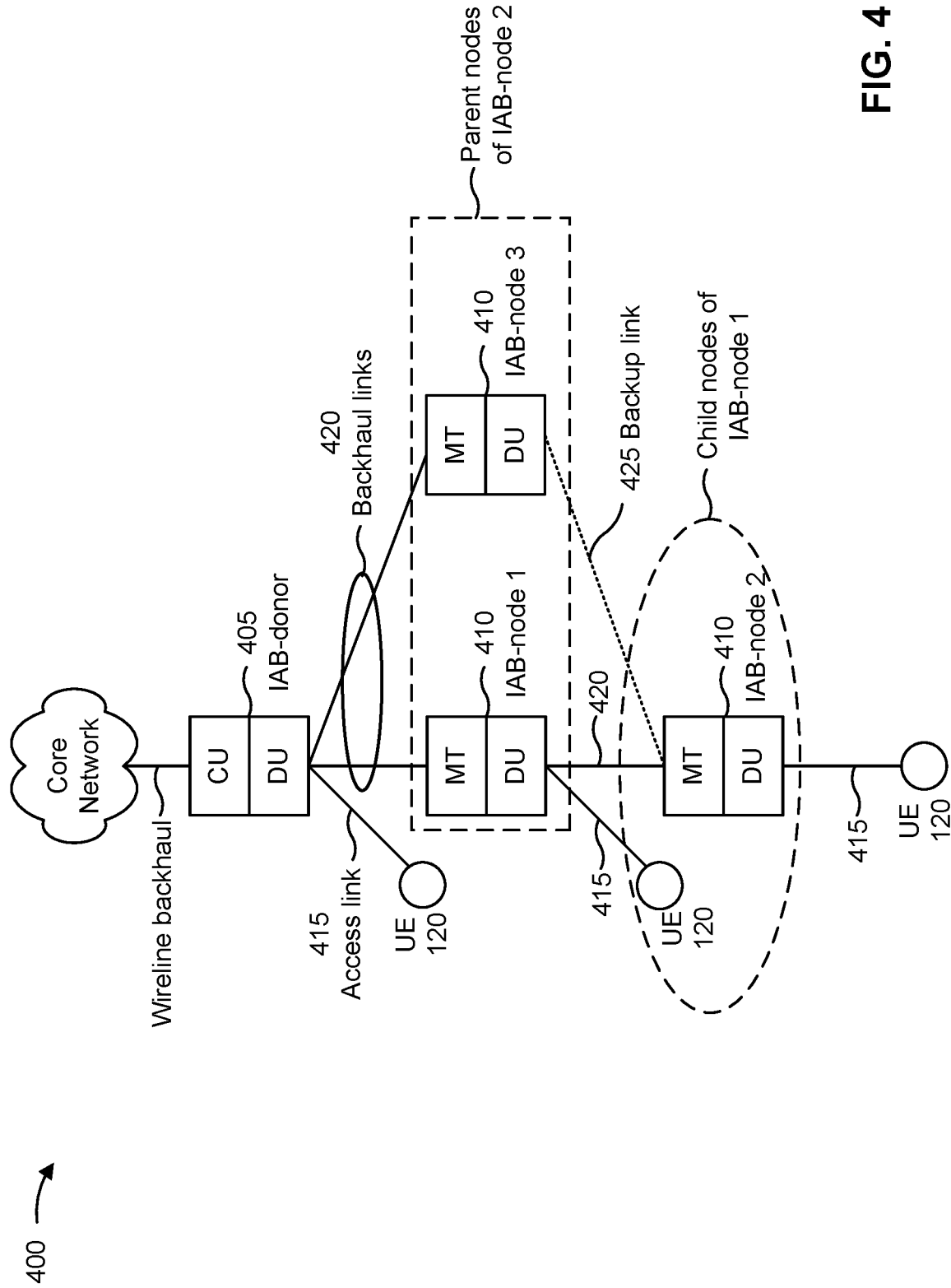
FIG. 4 is a diagram illustrating an example of an integrated access and backhauling (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., an access and mobility function (AMF)). In some aspects, an IAB donor 405 may include a base station 110, such as an anchor base station, as described above in connection with 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile terminal (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

As indicated above, FIG. 4 is provided as an example. Other examples may differ from what is described with regard to FIG. 4.

Figure 5:
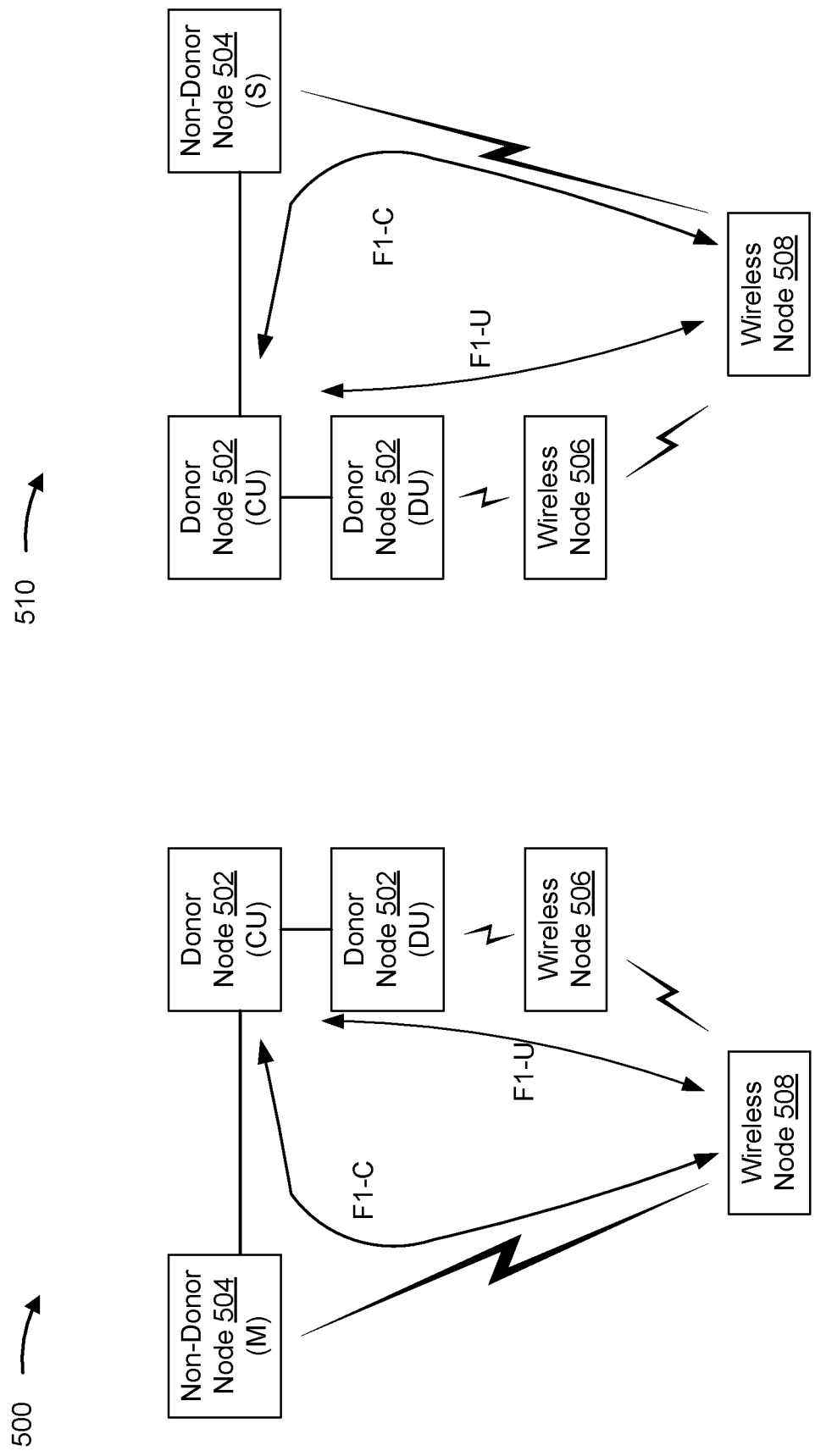
FIG. 5 is a diagram illustrating examples of an F1 control (F1-C) plane interface and an F1 user (F1-U) plane interface, in accordance with the present disclosure.

FIG. 5 is a diagram illustrating examples 500/510 of an F1 control plane (F1-C) interface and an F1 user plane (F1-U) interface, in accordance with the present disclosure.

As shown in FIG. 5, and in examples 500 and 510, a donor node 502 may include a CU and a DU. The CU of donor node 502 may connect with a non-donor node 504. In example 500, the non-donor node 504 may be a primary node, such as a main next generation RAN (M-NG-RAN) node (MN). In example 510, the non-donor node 504 may be a secondary node, such as a secondary next generation RAN (S-NG-RAN) node (SN). The DU of donor node 502 may connect with a wireless node 506. The wireless node 506 may connect with a wireless node 508. As described above, wireless node 508 may be a child wireless node with respect to wireless node 506. Wireless node 508 may also connect to non-donor node 504.

In example 500, donor node 502 may communicate F1-U traffic with wireless node 508 via wireless node 506. For example, donor node 502, which, in this case, may be an S-NG-RAN node, may establish a backhaul link to communicate F1-U traffic with wireless node 508. Additionally, or alternatively, donor node 502 may communicate F1-C traffic with wireless node 508 via non-donor node 504. For example, non-donor node 504 may establish an NR access link as an alternative path for F1-C communications between donor node 502 and wireless node 508.

Similarly, in example 510, donor node 502 may communicate F1-U traffic with wireless node 508 via wireless node 506. For example, donor node 502, which, in this case, may be an M-NG-RAN node, may establish a backhaul link to communicate F1-U traffic with wireless node 508. Additionally, or alternatively, donor node 502 may communicate F1-C traffic with wireless node 508 via non-donor node 504. For example, non-donor node 504 may establish an NR access link as an alternative path for F1-C communications between donor node 502 and wireless node 508. In this way, donor node 502 may enable use of an alternative path for conveying F1-C traffic. In other communications systems, such as LTE, a similar access link may be used for conveying F1-C traffic via an alternative path.

As indicated above, FIG. 5 is provided as an example. Other examples may differ from what is described with respect to FIG. 5.

Figure 6:
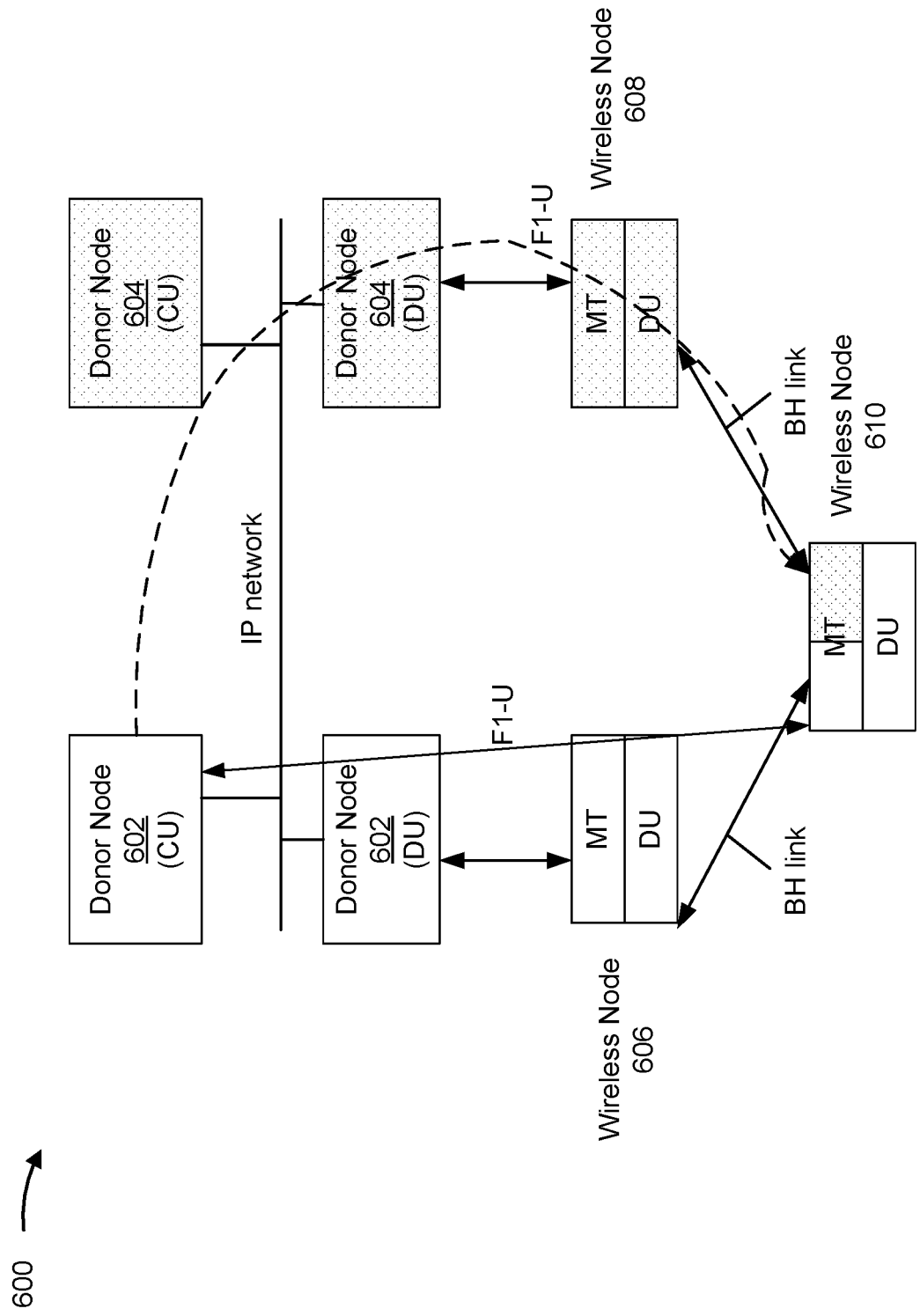
FIG. 6 is a diagram illustrating an example of F1-U re-routing using topological redundancy, in accordance with the present disclosure.

FIG. 6 is a diagram illustrating an example 600 of F1-U re-routing using topological redundancy, in accordance with the present disclosure. As shown in FIG. 6, example 600 may include a donor node 602 (e.g., which includes a CU and a DU), a donor node 604 (e.g., which includes a CU and a DU), a wireless node 606 (e.g., which includes an MT and a DU), a wireless node 608 (e.g., which includes an MT and a DU), and a wireless node 610 (e.g., which includes an MT and a DU). In this case, both donor node 602 (e.g., an MN) and donor node 604 (e.g., an SN) are donor nodes for wireless node 610. F1-U traffic may be conveyed between donor node 602 and wireless node 610 via multiple backhaul links (e.g., a main cell group (MCG) path from donor node 602 to wireless node 606 to wireless node 610, and a secondary cell group (SCG) path from donor node 602 to donor node 604 to wireless node 608 to wireless node 610). This inter-donor topology may provide redundancy for F1-U traffic. In some cases, F1-U traffic may be conveyed, via an IP network, directly between the CU of donor node 602 and the DU of donor node 604 (e.g., without passing through the DU of donor node 602 or the CU of donor node 604) to achieve the topological redundancy.

However, some network topologies may not support the topological redundancy of example 600. For example, in a network with an IAB donor node providing a main path, and an eNB or gNB providing a secondary path for F1-U traffic, the eNB or gNB may not support IAB donor functionality. Further, the eNB or gNB may not have a split architecture, so the eNB or gNB may lack a DU to which the IAB donor node CU can directly transmit F1-C traffic, thereby preventing bypass of a CU of the eNB or gNB as occurs in example 600. Moreover, the eNB or gNB may not support IP routing functionality for topological redundancy.

As indicated above, FIG. 6 is provided as an example. Other examples may differ from what is described with respect to FIG. 6.

Some aspects described herein enable re-routing of F1-U traffic via a Uu link. For example, a first base station (e.g., an IAB donor node) may communicate F1-U traffic with a second base station (e.g., a eNB or gNB), which may provide an alternative path to a destination wireless node (e.g., a UE) via at least one intermediate wireless node (e.g., an IAB node that is a parent wireless node of the destination wireless node). In this case, the first base station may communicate the F1-U traffic with the second base station via an Xn interface connection or an X2 interface connection, and the second base station may communicate the F1-U traffic with the intermediate wireless node via a Uu interface (e.g., an LTE Uu interface or an NR Uu interface, among other examples). In this way, the base stations and wireless nodes enable topological redundancy over an expanded set of types of device capabilities, such as for devices without a split architecture, without IP routing functionality, or without support for IAB donor functionality, among other examples. By expanding the set of device capabilities that may support topological redundancy, some aspects described herein reduce a likelihood of dropped communications or facilitate load balancing, among other examples, thereby improving network performance.

Figure 7:
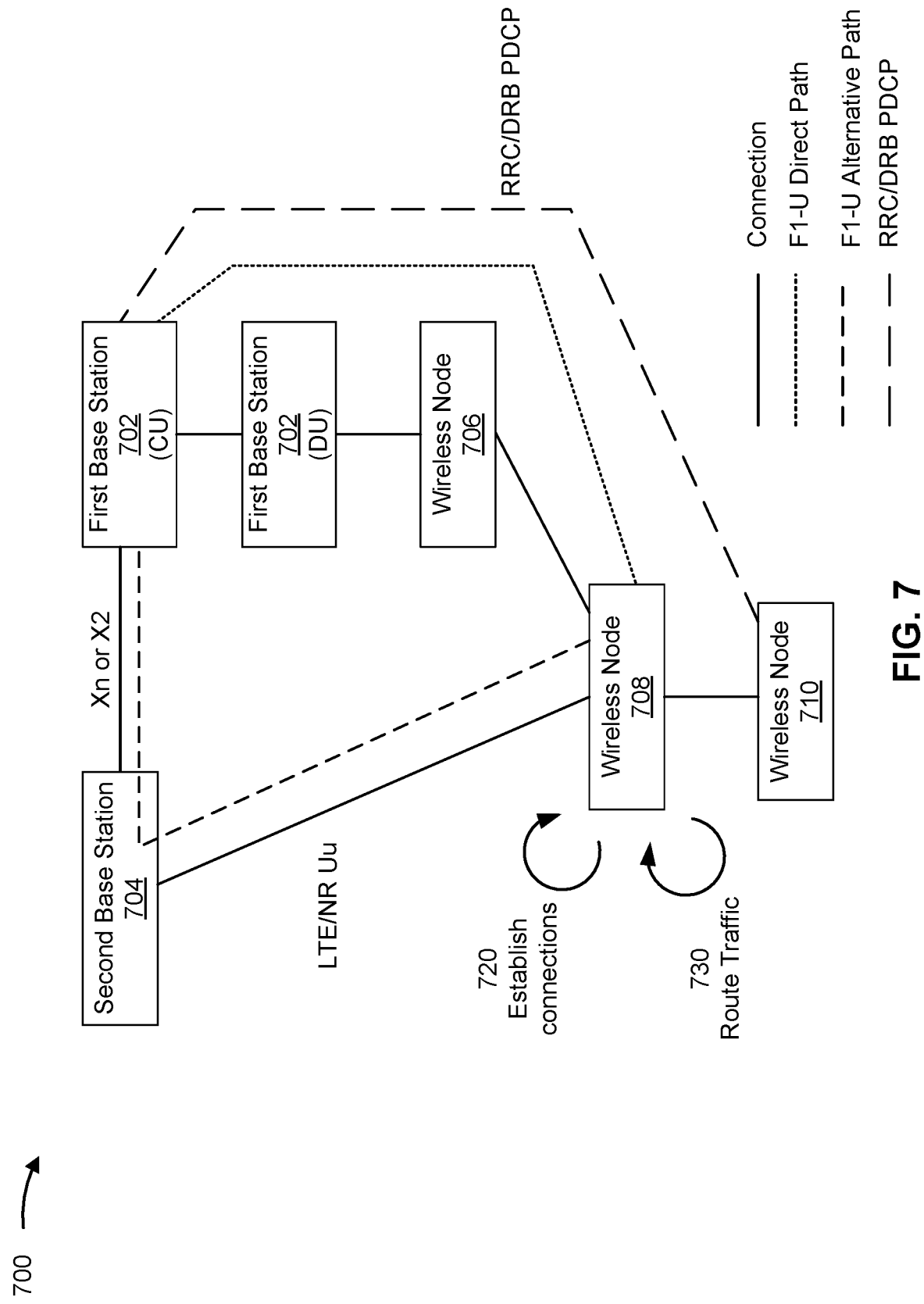
FIG. 7 is a diagram illustrating an example associated with user-plane traffic routing in an IAB deployments, in accordance with the present disclosure.

FIG. 7 is a diagram illustrating an example 700 associated with user-plane traffic routing in an IAB deployment, in accordance with the present disclosure. As shown in FIG. 7, example 700 includes communication between a set of devices included in a wireless network, such as wireless network 100 (which may include one or more wireless access links, such as one or more uplinks or one or more downlinks). In this case, example 700 may include a first base station 702 (e.g., which includes a CU and a DU), a second base station 704, a wireless node 706, a wireless node 708, and a wireless node 710. Wireless node 710 (e.g., a UE or an MT) may be a child wireless node of wireless node 708. In some aspects, one of first base station 702 or second base station 704 is an MN and the other of first base station 702 and second base station 704 is an SN for wireless node 710.

As further shown in FIG. 7, and by reference number 720, wireless node 708 may establish a set of connections. For example, wireless node 708 may establish a first connection (e.g., an F1-U direct path) between first base station 702 and wireless node 710 (e.g., the F1-U direct path includes the CU of first base station 702, the DU of first base station 702, a wireless node 706, and wireless node 708) and a second connection (e.g., an F1-U alternative path) between first base station 702 and wireless node 710 (e.g., the F1-U alternative path includes the CU of first base station 702, second base station 704, and wireless node 708). Wireless node 708 connects each of the F1-U direct path and the F1-U alternative path to one or more downstream nodes, such as wireless node 710. Additionally, or alternatively, first base station 702 and second base station 704 may establish the first and second connections. For example, first base station 702 may communicate with wireless node 708 to establish the first connection, and second base station 704 may communicate with wireless node 708 to establish the second connection. In this case, first base station 702 and second base station 704 may establish a third connection (e.g., on an Xn or X2 interface, among other examples) to enable forwarding of traffic on the F1-U alternative path.

In some aspects, wireless node 708 may report a capability, for forwarding user plane traffic, to first base station 702 and/or second base station 704. For example, wireless node 708 may indicate that wireless node 708 is capable of providing forwarding of user plane traffic, and wireless node 708, first base station 702, and/or second base station 704 may communicate to establish a set of connections based at least in part on the capability of wireless node 708. In some aspects, the capability may be frequency dependent. For example, wireless node 708 may indicate that wireless node 708 is capable of forwarding user plane traffic on some frequencies and not capable of forwarding user plane traffic on other frequencies. In this case, wireless node 708 may establish connections to provide forwarding on the frequencies for which wireless node 708 is capable of forwarding user plane traffic (or forgo establishing the connections if the user plane traffic is to be conveyed on the other frequencies for which wireless node 708 is not capable of forwarding user plane traffic).

In some aspects, the F1-U paths may include different frequency bands. For example, the F1-U direct path may use an mmWave frequency band for at least one transmission and the F1-U alternative path may include a Sub-6 frequency band for at least one transmission. In some aspects, the F1-U paths may be associated with the same cell group. For example, wireless node 710 may connect to first base station 702 and second base station 704 via cells of the same cell group. Additionally, or alternatively, wireless node 710 may connect to first base station 702 via a first cell group (e.g., one of an MCG or an SCG) and to second base station 704 via a second cell group (e.g., the other of an MCG or an SCG).

In some aspects, the F1-U alternative path provides a single-hop connection between the CU of first base station 702 and wireless node 708, thereby providing power efficiency and energy saving relative to a multi-hop transmission via the F1-U direct path. In this case, first base station 702, second base station 704, and wireless node 708 may enable dynamic switching between the F1-U direct path and the F1-U alternative path to balance energy savings and load balancing criteria.

In some aspects, first base station 702 and/or second base station 704 may configure a traffic mapping. For example, first base station 702 and/or second base station 704 may configure a mapping of user plane traffic between a base station interface (e.g., the Xn or X2 interface, among other examples) and an access link interface (e.g., the Uu interface), thereby enabling routing of user plane traffic between first base station 702 and wireless node 708 (and wireless node 710) via second base station 704.

In some aspects, first base station 702 and/or second base station 704 may configure a tunnel to support routing of user plane traffic between first base station 702 and second base station 704. For example, first base station 702 and second base station 704 may communicate to provide IP address information for a set of tunnel endpoints on a base station user plane interface (e.g., an Xn-U or X2-U interface, among other examples). In this case, the tunnel may be configured for transportation of traffic associated with wireless node 708 and wireless node 710. In some aspects, the tunnel may aggregate traffic associated with a plurality of bearers or F1-U tunnels. For example, first base station 702 and second base station 704 may establish a tunnel and aggregate traffic of a plurality of bearers associated with wireless node 710. Additionally, or alternatively, first base station 702 and second base station 704 may establish a tunnel and aggregate traffic of a first bearer of wireless node 710 and a second bearer of another child wireless node of wireless node 708. In this way, first base station 702 and/or second base station 704 may enable second base station 704 to map user plane traffic associated with wireless node 710 (and/or any other child wireless nodes of wireless node 708 for which a tunnel is configured) between a first radio link channel or radio bearer with wireless node 708 and a second radio link channel or radio bearer with first base station 702.

In some aspects, second base station 704 may provide quality of service (QoS) information in connection with user plane traffic routing. For example, second base station 704 may provide, to first base station 702, QoS information indicating a QoS associated with user plane traffic that is to be or is being routed via the F1-U alternative path. In this case, first base station 702 may enable forwarding of traffic via the F1-U alternative path and second base station 704 based at least in part on the QoS information. Additionally, or alternatively, when establishing a tunnel between first base station 702 and second base station 704 (or configuring an existing tunnel), first base station 702 and second base station 704 may configure the tunnel based at least in part on the QoS information. Additionally, or alternatively, second base station 704 may configure a radio link control (RLC) channel and/or a mapping of user plane traffic thereto with wireless node 708 based at least in part on the QoS information.

In some aspects, wireless node 708 may receive path information from first base station 702 and/or second base station 704. For example, wireless node 708 may receive information indicating the F1-U direct path or the F1-U alternative path. In this case, the path information may be specific to wireless node 710 or specific to a bearer established for wireless node 710 (e.g., the path information may identify wireless node 710 or a bearer thereof). Additionally, or alternatively, the path information may be general to wireless node 708 (e.g., not specific to wireless node 710), thereby enabling wireless node 708 to map user plane traffic onto the F1-U direct path or the F1-U alternative path for one or more child wireless nodes connected to wireless node 708.

In some aspects, wireless node 708 may communicate with first base station 702 and/or second base station 704 to identify IP address information for forwarding user plane traffic associated with wireless node 710. For example, wireless node 708 may indicate IP address information to first base station 702 and/or second base station 704 to enable first base station 702 and/or second base station 704 to transmit user plane traffic to wireless node 708 for forwarding to wireless node 710. Additionally, or alternatively, wireless node 708 may request and receive IP address information from first base station 702 and/or second base station 704 to enable wireless node 708 to transmit user plane traffic to first base station 702 (e.g., via second base station 704).

As further shown in FIG. 7, and by reference number 730, wireless node 708 may route traffic. For example, wireless node 708 may forward user plane traffic between wireless node 710 and first base station 702 via the first connection and/or the second connection. In this case, the user plane traffic may be associated with an F1-U general packet radio service (GPRS) tunneling protocol (GTP) user plane (GTP-U) tunnel (e.g., of a child data bearer). For example, the user plane traffic may include a set of IP data segments forming uplink traffic or downlink traffic.

In some aspects, wireless node 708 may map user plane traffic onto an access channel to forward user plane traffic between wireless node 710 and second base station 704 (and onward to first base station 702). For example, wireless node 708 may map user plane traffic, using the Uu link between wireless node 708 and second base station 704, onto a radio link control (RLC) channel. In this way, wireless node 708 may enable communicating of user plane traffic from the wireless node 710 to second base station 704 (and onward to first base station 702). In this case, second base station 704 may map the user plane traffic onto a base station interface (e.g., the Xn interface or the X2 interface, among other examples) to forward the user plane traffic to first base station 702. Similarly, for downlink, second base station 704 may receive user plane traffic from the base station interface and map the user plane traffic to an RLC channel to direct the user plane traffic to wireless node 708 and onward to wireless node 710.

As indicated above, FIG. 7 is provided as an example. Other examples may differ from what is described with respect to FIG. 7.

FIG. 8 is a diagram illustrating an example process 800 performed, for example, by a wireless node, in accordance with the present disclosure. Example process 800 is an example where the wireless node (e.g., wireless node 708) performs operations associated with user-plane traffic routing in IAB deployments.

As shown in FIG. 8, in some aspects, process 800 may include establishing a first connection between a child wireless node and a first base station and a second connection between the child wireless node and the first base station via a second base station, wherein the first connection is an F1-U direct path and the second connection is an F1-U alternative path (block 810). For example, the wireless node (e.g., using communication manager 140 or 150 and/or connection establishment component 1108, depicted in FIG. 11) may establish a first connection between a child wireless node and a first base station and a second connection between the child wireless node and the first base station via a second base station, wherein the first connection is an F1-U direct path and the second connection is an F1-U alternative path, as described above.

As further shown in FIG. 8, in some aspects, process 800 may include forwarding at least a portion of user-plane traffic between the child wireless node and the first base station via the second connection and the second base station (block 820). For example, the wireless node (e.g., using communication manager 140 or 150 and/or forwarding component 1110, depicted in FIG. 11) may forward at least a portion of user-plane traffic between the child wireless node and the first base station via the second connection and the second base station, as described above.

Process 800 may include additional aspects, such as any single aspect or any combination of aspects described below and/or in connection with one or more other processes described elsewhere herein.

In a first aspect, the first base station is a donor of the wireless node and the second base station is not a donor of the wireless node.

In a second aspect, alone or in combination with the first aspect, process 800 includes detecting a satisfaction of a switching condition associated with a network, and switching, based at least in part on detecting the satisfaction of the switching condition, to forwarding at least another portion of the user-plane traffic between the child wireless node and the first base station via the first connection.

In a third aspect, alone or in combination with one or more of the first and second aspects, the switching condition is at least one of an energy utilization condition or a load balancing condition.

In a fourth aspect, alone or in combination with one or more of the first through third aspects, at least one of the first base station or the second base station is a primary node of the wireless node and the other of the first base station or the second base station is a secondary node of the wireless node.

In a fifth aspect, alone or in combination with one or more of the first through fourth aspects, the wireless node is connected to the first base station and the second base station via a single cell group.

In a sixth aspect, alone or in combination with one or more of the first through fifth aspects, the wireless node is connected to the first base station via a first cell group and is connected to the second base station via a second cell group.

In a seventh aspect, alone or in combination with one or more of the first through sixth aspects, the child wireless node is a user equipment or a mobile terminal.

In an eighth aspect, alone or in combination with one or more of the first through seventh aspects, the portion of the user-plane traffic is at least one of traffic associated with an F1-U GTP-U tunnel of a child data bearer, IP traffic associated with the F1-U GTP-U tunnel, uplink traffic, or downlink traffic.

In a ninth aspect, alone or in combination with one or more of the first through eighth aspects, the portion of the user-plane traffic is conveyed via a Uu link to the second base station and mapped to an access RLC channel associated with the second connection between the child wireless node and the second base station.

In a tenth aspect, alone or in combination with one or more of the first through ninth aspects, the portion of the user-plane traffic is conveyed via a BH RLC channel associated with the second connection between the child wireless node and the second base station.

In an eleventh aspect, alone or in combination with one or more of the first through tenth aspects, a configuration of the BH RLC channel at least one of is configured at the wireless node or includes a mapping configuration.

In a twelfth aspect, alone or in combination with one or more of the first through eleventh aspects, the forwarding of the portion of the user-plane traffic is based at least in part on a path indication received from the first base station or the second base station.

In a thirteenth aspect, alone or in combination with one or more of the first through twelfth aspects, the path indication is at least one of an indication of the first connection, an indication of the second connection, an instruction specific to the child wireless node, or an instruction specific to a bearer associated with the child wireless node.

In a fourteenth aspect, alone or in combination with one or more of the first through thirteenth aspects, the forwarding of the portion of the user-plane traffic is based at least in part on address information associated with the first base station or the second base station, wherein the address information is specific to the portion of the user-plane traffic or a path for communicating the user-plane traffic.

In a fifteenth aspect, alone or in combination with one or more of the first through fourteenth aspects, process 800 includes transmitting information identifying a capability of the wireless node for forwarding user-plane traffic, and forwarding the user-plane traffic comprises forwarding the user-plane traffic based at least in part on transmitting the information identifying the capability.

In a sixteenth aspect, alone or in combination with one or more of the first through fifteenth aspects, the capability is a frequency-dependent capability.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a first base station, in accordance with the present disclosure. Example process 900 is an example where the first base station (e.g., base station 110 or first base station 702) performs operations associated with user-plane traffic routing in IAB deployments.

As shown in FIG. 9, in some aspects, process 900 may include establishing a first connection to a child wireless node via a wireless node and a second connection to the child wireless node via a second base station and the wireless node, wherein the first connection is an F1-U direct path and the second connection is an F1-U alternative path (block 910). For example, the first base station (e.g., using communication manager 150 and/or connection establishment component 1208, depicted in FIG. 12) may establish a first connection to a child wireless node via a wireless node and a second connection to the child wireless node via a second base station and the wireless node, wherein the first connection is an F1-U direct path and the second connection is an F1-U alternative path, as described above.

As further shown in FIG. 9, in some aspects, process 900 may include communicating at least a portion of user-plane traffic with the child wireless node via the second connection, the wireless node, and the second base station (block 920). For example, the first base station (e.g., using communication manager 150 and/or reception component 1202 and/or transmission component 1204, depicted in FIG. 12) may communicate at least a portion of user-plane traffic with the child wireless node via the second connection, the wireless node, and the second base station, as described above.

Process 900 may include additional aspects, such as any single aspect or any combination of aspects described below and/or in connection with one or more other processes described elsewhere herein.

In a first aspect, the first base station and the second base station are connected via a configured tunnel.

In a second aspect, alone or in combination with the first aspect, the tunnel is associated with an Xn or X2 interface.

In a third aspect, alone or in combination with one or more of the first and second aspects, the tunnel is associated with transporting integrated access and backhauling mobile terminal-associated traffic.

In a fourth aspect, alone or in combination with one or more of the first through third aspects, the tunnel aggregates traffic associated with a plurality of bearers associated with the child wireless node or a plurality of bearers associated with a plurality of child wireless nodes.

In a fifth aspect, alone or in combination with one or more of the first through fourth aspects, process 900 includes providing quality of service information associated with enabling communication of traffic via the second connection and the second base station.

In a sixth aspect, alone or in combination with one or more of the first through fifth aspects, the first base station is a donor of the wireless node and the second base station is not a donor of the wireless node.

In a seventh aspect, alone or in combination with one or more of the first through sixth aspects, at least one of the first base station or the second base station is a primary node of the wireless node, and the other of the first base station or the second base station is a secondary node of the wireless node.

In an eighth aspect, alone or in combination with one or more of the first through seventh aspects, the wireless node is connected to the first base station and the second base station via a single cell group.

In a ninth aspect, alone or in combination with one or more of the first through eighth aspects, the wireless node is connected to the first base station via a first cell group and is connected to the second base station via a second cell group.

In a tenth aspect, alone or in combination with one or more of the first through ninth aspects, the child wireless node is a user equipment or a mobile terminal.

In an eleventh aspect, alone or in combination with one or more of the first through tenth aspects, the portion of the user-plane traffic is at least one of traffic associated with an F1-U GTP-U tunnel of a child data bearer, IP traffic associated with the F1-U GTP-U tunnel, uplink traffic, or downlink traffic.

In a twelfth aspect, alone or in combination with one or more of the first through eleventh aspects, the portion of the user-plane traffic is conveyed via a Uu link to the second base station and mapped to an access RLC channel associated with the second connection between the child wireless node and the second base station.

In a thirteenth aspect, alone or in combination with one or more of the first through twelfth aspects, the portion of the user-plane traffic is conveyed via a BH radio link control (RLC) channel associated with the second connection between the child wireless node and the second base station.

In a fourteenth aspect, alone or in combination with one or more of the first through thirteenth aspects, a configuration of the BH RLC channel is at least one of configured at the wireless node, received by the first base station, or includes a mapping configuration.

In a fifteenth aspect, alone or in combination with one or more of the first through fourteenth aspects, process 900 includes transmitting a path indication to the wireless node to cause the wireless node to forward the portion of the user-plane traffic.

In a sixteenth aspect, alone or in combination with one or more of the first through fifteenth aspects, the path indication is at least one of an indication of the first connection, an indication of the second connection, an instruction specific to the child wireless node, or an instruction specific to a bearer associated with the child wireless node.

In a seventeenth aspect, alone or in combination with one or more of the first through sixteenth aspects, process 900 includes transmitting address information for forwarding of the user-plane traffic between the wireless node and the first base station, wherein the address information is specific to the portion of the user-plane traffic or a path for communicating the user-plane traffic.

In an eighteenth aspect, alone or in combination with one or more of the first through seventeenth aspects, process 900 includes receiving information identifying a capability of the wireless node for forwarding user-plane traffic, and communicating the user-plane traffic comprises communicating the user-plane traffic based at least in part on receiving the information identifying the capability.

In a nineteenth aspect, alone or in combination with one or more of the first through eighteenth aspects, the capability is a frequency-dependent capability.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a second base station, in accordance with the present disclosure. Example process 1000 is an example where the second base station (e.g., base station 110, second base station 704) performs operations associated with user-plane traffic routing in IAB deployments.

As shown in FIG. 10, in some aspects, process 1000 may include establishing a second connection between a first base station and a child wireless node via a wireless node, wherein the child wireless node is associated with a first connection to a first base station via the wireless node, and wherein the first connection is an F1-U direct path and the second connection is an F1-U alternative path (block 1010).

Figure 12:
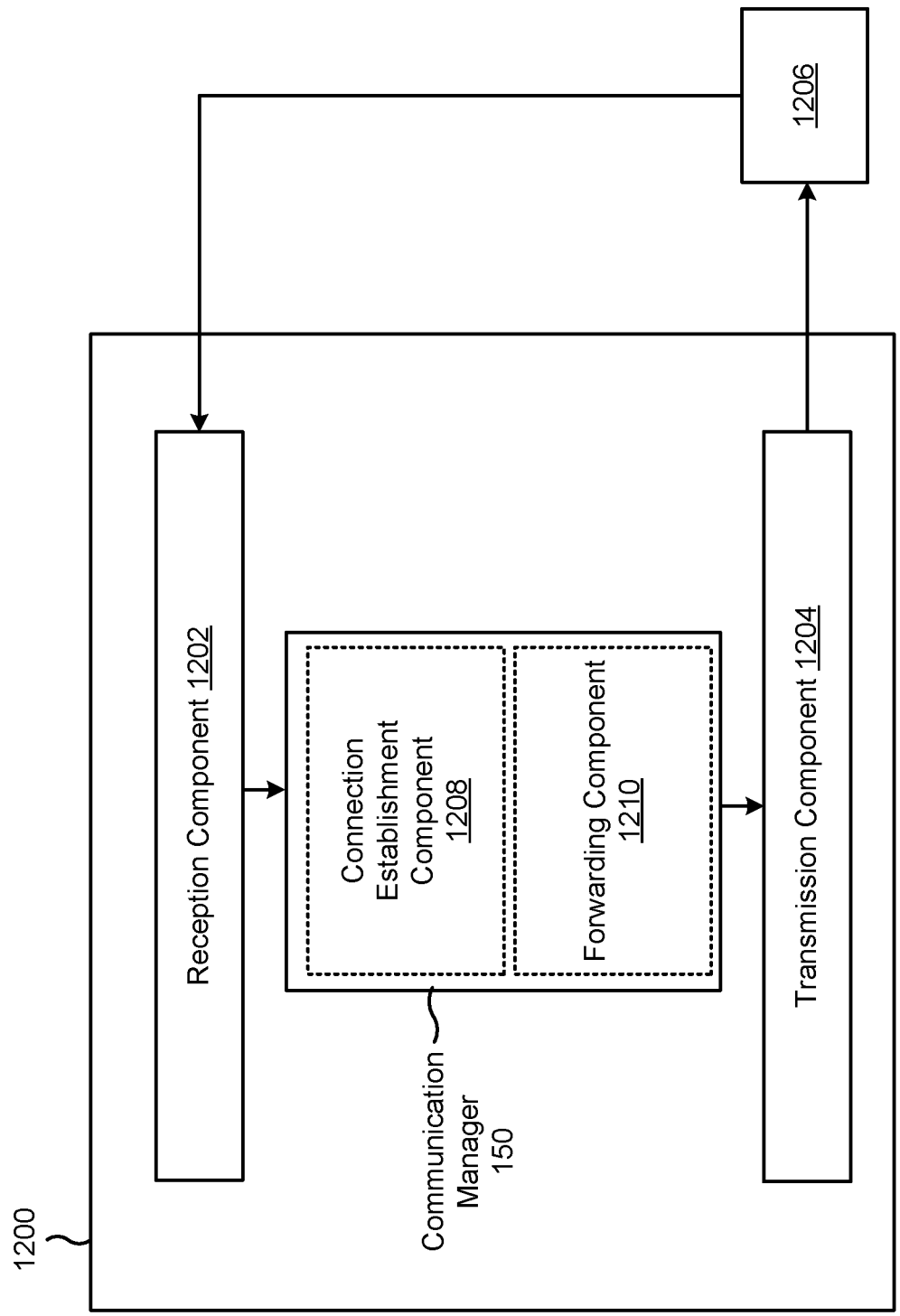

For example, the second base station (e.g., using communication manager 150 and/or connection establishment component 1208, depicted in FIG. 12) may establish a second connection to a child wireless node via a wireless node, wherein the child wireless node is associated with a first connection to a first base station via the wireless node, and wherein the first connection is an F1-U direct path and the second connection is an F1-U alternative path, as described above.

As further shown in FIG. 10, in some aspects, process 1000 may include forwarding at least a portion of user-plane traffic between the first base station and the child wireless node via the second connection and the wireless node (block 1020). For example, the second base station (e.g., using communication manager 150 and/or forwarding component 1210, depicted in FIG. 12) may forward at least a portion of user-plane traffic between the first base station and the child wireless node via the second connection and the wireless node, as described above.

Process 1000 may include additional aspects, such as any single aspect or any combination of aspects described below and/or in connection with one or more other processes described elsewhere herein.

In a first aspect, the first base station and the second base station are connected via a configured tunnel.

In a second aspect, alone or in combination with the first aspect, the tunnel is associated with an Xn or X2 interface.

In a third aspect, alone or in combination with one or more of the first and second aspects, the tunnel is associated with transporting integrated access and backhauling mobile terminal associated traffic.

In a fourth aspect, alone or in combination with one or more of the first through third aspects, the tunnel aggregates traffic associated with a plurality of bearers associated with the child wireless node or a plurality of bearers associated with a plurality of child wireless nodes.

In a fifth aspect, alone or in combination with one or more of the first through fourth aspects, process 1000 includes receiving quality of service information associated with enabling communication of traffic via the second connection and the second base station, and forwarding the at least the portion of the user-plane traffic comprises forwarding the portion of the user-plane traffic based at least in part on the quality of service information.

In a sixth aspect, alone or in combination with one or more of the first through fifth aspects, the first base station is a donor of the wireless node and the second base station is not a donor of the wireless node.

In a seventh aspect, alone or in combination with one or more of the first through sixth aspects, at least one of the first base station or the second base station is a primary node of the wireless node and the other of the first base station or the second base station is a secondary node of the wireless node.

In an eighth aspect, alone or in combination with one or more of the first through seventh aspects, the wireless node is connected to the first base station and the second base station via a single cell group.

In a ninth aspect, alone or in combination with one or more of the first through eighth aspects, the wireless node is connected to the first base station via a first cell group and is connected to the second base station via a second cell group.

In a tenth aspect, alone or in combination with one or more of the first through ninth aspects, the child wireless node is a user equipment or a mobile terminal.

In an eleventh aspect, alone or in combination with one or more of the first through tenth aspects, the portion of the user-plane traffic is at least one of traffic associated with an F1-U GTP-U tunnel of a child data bearer, IP traffic associated with the F1-U GTP-U tunnel, uplink traffic, or downlink traffic.

In a twelfth aspect, alone or in combination with one or more of the first through eleventh aspects, the portion of the user-plane traffic is conveyed via a Uu link to the second base station and mapped to an access RLC channel associated with the second connection between the child wireless node and the second base station.

In a thirteenth aspect, alone or in combination with one or more of the first through twelfth aspects, the portion of the user-plane traffic is conveyed via a BH RLC channel associated with the second connection between the child wireless node and the second base station.

In a fourteenth aspect, alone or in combination with one or more of the first through thirteenth aspects, a configuration of the BH RLC channel is at least one of configured at the wireless node, provided to the first base station, or includes a mapping configuration.

In a fifteenth aspect, alone or in combination with one or more of the first through fourteenth aspects, process 1000 includes transmitting address information for forwarding of the user-plane traffic between the wireless node and the first base station, wherein the address information is specific to the portion of the user-plane traffic or a path for communicating the user-plane traffic.

In a sixteenth aspect, alone or in combination with one or more of the first through fifteenth aspects, process 1000 includes receiving information identifying a capability of the wireless node for forwarding user-plane traffic, and forwarding the user-plane traffic comprises forwarding the user-plane traffic based at least in part on receiving the information identifying the capability.

In a seventeenth aspect, alone or in combination with one or more of the first through sixteenth aspects, the capability is a frequency-dependent capability.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
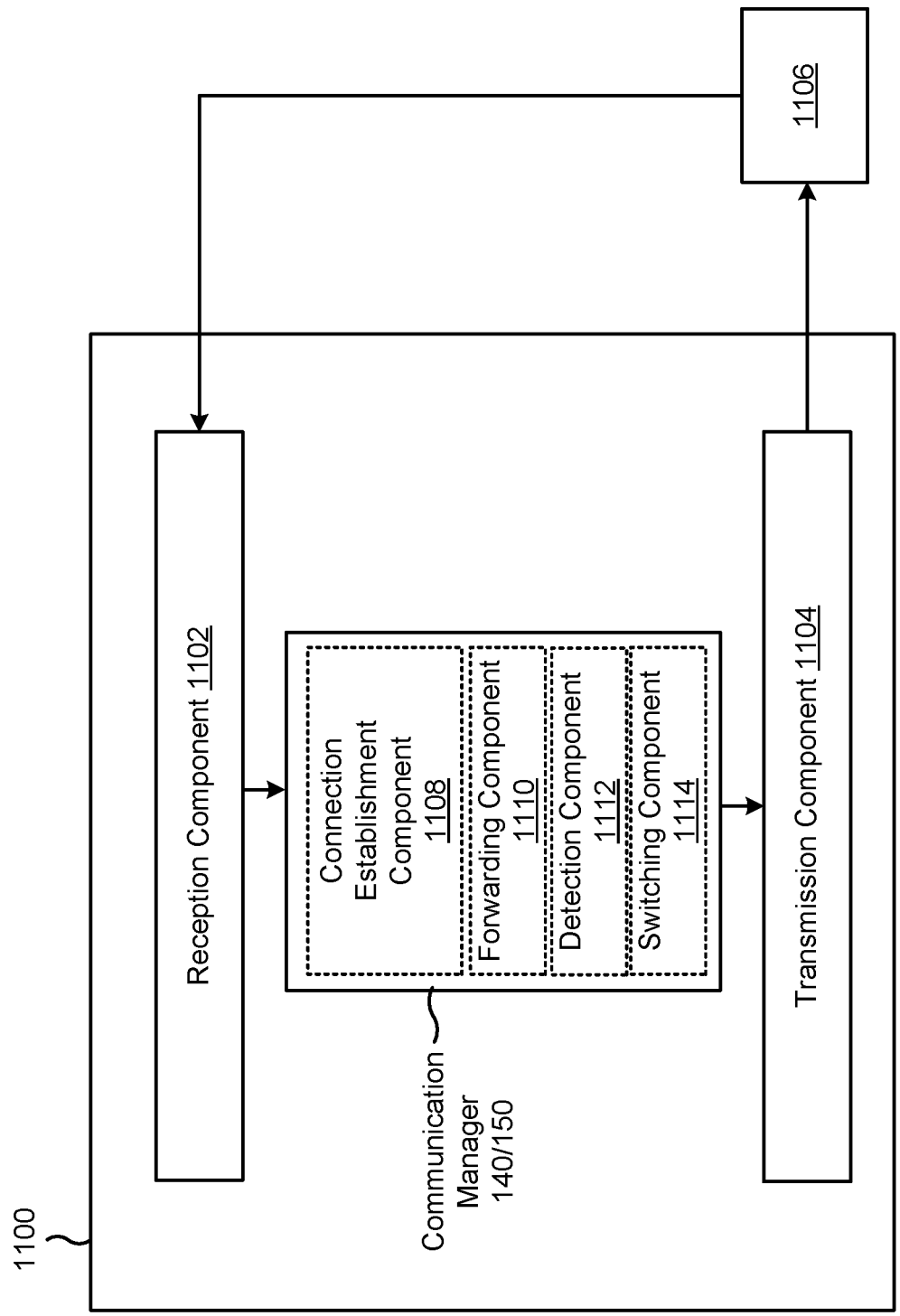
FIGS. 11-12 are block diagrams of example apparatuses for wireless communication, in accordance with the present disclosure.

FIG. 11 is a block diagram of an example apparatus 1100 for wireless communication. The apparatus 1100 may be a wireless node, or a wireless node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a wireless node, or another wireless communication device) using the reception component 1102 and the transmission component 1104. As further shown, the apparatus 1100 may include the communication manager 140 or 150. The communication manager 140 or 150 may include one or more of a connection establishment component 1108, a forwarding component 1110, a detection component 1112, or a switching component 1114, among other examples.

In some aspects, the apparatus 1100 may be configured to perform one or more operations described herein in connection with FIG. 7. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the wireless node described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the wireless node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the wireless node described above in connection with FIG. 2. In some aspects, the transmission component 1104 may be co-located with the reception component 1102 in a transceiver.

The connection establishment component 1108 may establish a first connection between a child wireless node and a first base station and a second connection between the child wireless node and a second base station, wherein the first connection is an F1-U direct path and the second connection is an F1-U alternative path. The forwarding component 1110 may forward at least a portion of user-plane traffic between the child wireless node and the first base station via the second connection and the second base station.

The detection component 1112 may detect a satisfaction of a switching condition associated with a network. The switching component 1114 may switch, based at least in part on detecting the satisfaction of the switching condition, to forwarding at least another portion of the user-plane traffic between the child wireless node and the first base station via the first connection. The transmission component 1104 may transmit information identifying a capability of the wireless node for forwarding user-plane traffic.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1100 may include the communication manager 150. The communication manager 150 may include one or more of a connection establishment component 1208 or a forwarding component 1210, among other examples.

In some aspects, the apparatus 1200 may be configured to perform one or more operations described herein in connection with FIG. 7. Additionally, or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The connection establishment component 1208 may establish a first connection to a child wireless node via a wireless node and a second connection to a second base station that is connected to the child wireless node via the wireless node, wherein the first connection is an F1-U direct path and the second connection is an F1-U alternative path. The reception component 1202 and/or the transmission component 1204 may communicate at least a portion of user-plane traffic with the child wireless node via the second connection, the wireless node, and the second base station.

The transmission component 1204 may provide quality of service information associated with enabling communication of traffic via the second connection and the second base station. The transmission component 1204 may transmit a path indication to the wireless node to cause the wireless node to forward the portion of the user-plane traffic. The transmission component 1204 may transmit address information for forwarding of the user-plane traffic between the wireless node and the first base station, wherein the address information is specific to the portion of the user-plane traffic or a path for communicating the user-plane traffic. The reception component 1202 may receive information identifying a capability of the wireless node for forwarding user-plane traffic.

The connection establishment component 1208 may establish a second connection to a child wireless node via a wireless node, wherein the child wireless node is associated with a first connection to a first base station via the wireless node, and wherein the first connection is an F1-U direct path and the second connection is an F1-U alternative path. The forwarding component 1210 may forward at least a portion of user-plane traffic between the first base station and the child wireless node via the second connection and the wireless node.

The reception component 1202 may receive quality of service information associated with enabling communication of traffic via the second connection and the second base station. The transmission component 1204 may transmit address information for forwarding of the user-plane traffic between the wireless node and the first base station, wherein the address information is specific to the portion of the user-plane traffic or a path for communicating the user-plane traffic. The reception component 1202 may receive information identifying a capability of the wireless node for forwarding user-plane traffic.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a wireless node, comprising: establishing a first connection between a child wireless node and a first base station and a second connection between the child wireless node and the first base station via a second base station, wherein the first connection is an F1-U direct path and the second connection is an F1-U alternative path; and forwarding at least a portion of user-plane traffic between the child wireless node and the first base station via the second connection and the second base station.

Aspect 2: The method of Aspect 1, wherein the first base station is a donor of the wireless node and the second base station is not a donor of the wireless node.

Aspect 3: The method of any of Aspects 1 to 2, further comprising: detecting a satisfaction of a switching condition associated with a network; and switching, based at least in part on detecting the satisfaction of the switching condition, to forwarding at least another portion of the user-plane traffic between the child wireless node and the first base station via the first connection.

Aspect 4: The method of Aspect 3, wherein the switching condition is at least one of: an energy utilization condition or a load balancing condition.

Aspect 5: The method of any of Aspects 1 to 4, wherein at least one of the first base station or the second base station is a primary node of the wireless node and the other of the first base station or the second base station is a secondary node of the wireless node.

Aspect 6: The method of any of Aspects 1 to 5, wherein the wireless node is connected to the first base station and the second base station via a single cell group.

Aspect 7: The method of any of Aspects 1 to 6, wherein the wireless node is connected to the first base station via a first cell group and is connected to the second base station via a second cell group.

Aspect 8: The method of any of Aspects 1 to 7, wherein the child wireless node is a user equipment or a mobile terminal.

Aspect 9: The method of any of Aspects 1 to 8, wherein the portion of the user-plane traffic is at least one of: traffic associated with an F1-U general packet radio service (GPRS) tunneling protocol (GTP-U) tunnel of a child data bearer, Internet protocol (IP) traffic associated with the F1-U GTP-U tunnel, uplink traffic, or downlink traffic.

Aspect 10: The method of Aspect 1, wherein the portion of the user-plane traffic is conveyed via a Uu link to the second base station and mapped to an access radio link control (RLC) channel associated with the second connection between the child wireless node and the second base station.

Aspect 11: The method of any of Aspects 1 to 9, wherein the portion of the user-plane traffic is conveyed via a backhaul (BH) radio link control (RLC) channel associated with the second connection between the child wireless node and the second base station.

Aspect 12: The method of Aspect 11, wherein a configuration of the BH RLC channel at least one of: is configured at the wireless node or includes a mapping configuration.

Aspect 13: The method of any of Aspects 1 to 12, wherein the forwarding of the portion of the user-plane traffic is based at least in part on a path indication received from the first base station or the second base station.

Aspect 14: The method of Aspect 13, wherein the path indication is at least one of: an indication of the first connection, an indication of the second connection, an instruction specific to the child wireless node, or an instruction specific to a bearer associated with the child wireless node.

Aspect 15: The method of any of Aspects 1 to 14, wherein the forwarding of the portion of the user-plane traffic is based at least in part on address information associated with the first base station or the second base station, wherein the address information is specific to the portion of the user-plane traffic or a path for communicating the user-plane traffic.

Aspect 16: The method of any of Aspects 1 to 15, further comprising: transmitting information identifying a capability of the wireless node for forwarding user-plane traffic; and wherein forwarding the user-plane traffic comprises: forwarding the user-plane traffic based at least in part on transmitting the information identifying the capability.

Aspect 17: The method of Aspect 16, wherein the capability is a frequency-dependent capability.

Aspect 18: A method of wireless communication performed by a first base station, comprising: establishing a first connection to a child wireless node via a wireless node and a second connection to the child wireless node via a second base station and the wireless node, wherein the first connection is an F1-U direct path and the second connection is an F1-U alternative path; and communicating at least a portion of user-plane traffic with the child wireless node via the second connection, the wireless node, and the second base station.

Aspect 19: The method of Aspect 18, wherein the first base station and the second base station are connected via a configured tunnel.

Aspect 20: The method of Aspect 19, wherein the tunnel is associated with an Xn or X2 interface.

Aspect 21: The method of any of Aspects 19 to 20, wherein the tunnel is associated with transporting integrated access and backhauling mobile terminal-associated traffic.

Aspect 22: The method of any of Aspects 19 to 21, wherein the tunnel aggregates traffic associated with: a plurality of bearers associated with the child wireless node, a plurality of bearers associated with a plurality of child wireless nodes.

Aspect 23: The method of any of Aspects 19 to 22, further comprising: providing quality of service information associated with enabling communication of traffic via the second connection and the second base station.

Aspect 24: The method of any of Aspects 18 to 23, wherein the first base station is a donor of the wireless node and the second base station is not a donor of the wireless node.

Aspect 25: The method of any of Aspects 18 to 24, wherein at least one of the first base station or the second base station is a primary node of the wireless node, and the other of the first base station or the second base station is a secondary node of the wireless node.

Aspect 26: The method of any of Aspects 18 to 25, wherein the wireless node is connected to the first base station and the second base station via a single cell group.

Aspect 27: The method of any of Aspects 18 to 26, wherein the wireless node is connected to the first base station via a first cell group and is connected to the second base station via a second cell group.

Aspect 28: The method of any of Aspects 18 to 27, wherein the child wireless node is a user equipment or a mobile terminal.

Aspect 29: The method of any of Aspects 18 to 28, wherein the portion of the user-plane traffic is at least one of: traffic associated with an F1-U general packet radio service (GPRS) tunneling protocol (GTP-U) tunnel of a child data bearer, Internet protocol (IP) traffic associated with the F1-U GTP-U tunnel, uplink traffic, or downlink traffic.

Aspect 30: The method of any of Aspects 18 to 29, wherein the portion of the user-plane traffic is conveyed via a Uu link to the second base station and mapped to an access radio link control (RLC) channel associated with the second connection between the child wireless node and the second base station.

Aspect 31: The method of any of Aspects 18 to 30, wherein the portion of the user-plane traffic is conveyed via a backhaul (BH) radio link control (RLC) channel associated with the second connection between the child wireless node and the second base station.

Aspect 32: The method of Aspect 31, wherein a configuration of the BH RLC channel is at least one of: configured at the wireless node, received by the first base station, or includes a mapping configuration.

Aspect 33: The method of any of Aspects 18 to 32, further comprising: transmitting a path indication to the wireless node to cause the wireless node to forward the portion of the user-plane traffic.

Aspect 34: The method of Aspect 33, wherein the path indication is at least one of: an indication of the first connection, an indication of the second connection, an instruction specific to the child wireless node, or an instruction specific to a bearer associated with the child wireless node.

Aspect 35: The method of any of Aspects 18 to 34, further comprising: transmitting address information for forwarding of the user-plane traffic between the wireless node and the first base station, wherein the address information is specific to the portion of the user-plane traffic or a path for communicating the user-plane traffic.

Aspect 36: The method of any of Aspects 18 to 35, further comprising: receiving information identifying a capability of the wireless node for forwarding user-plane traffic; and wherein communicating the user-plane traffic comprises: communicating the user-plane traffic based at least in part on receiving the information identifying the capability.

Aspect 37: The method of Aspect 36, wherein the capability is a frequency-dependent capability.

Aspect 38: A method of wireless communication performed by a second base station, comprising: establishing a second connection between a first base station and a child wireless node via a wireless node, wherein the child wireless node is associated with a first connection to the first base station via the wireless node, and wherein the first connection is an F1-U direct path and the second connection is an F1-U alternative path; and forwarding at least a portion of user-plane traffic between the first base station and the child wireless node via the second connection and the wireless node.

Aspect 39: The method of Aspect 38, wherein the first base station and the second base station are connected via a configured tunnel.

Aspect 40: The method of Aspect 39, wherein the tunnel is associated with an Xn or X2 interface.

Aspect 41: The method of any of Aspects 39 to 40, wherein the tunnel is associated with transporting integrated access and backhauling mobile terminal-associated traffic.

Aspect 42: The method of any of Aspects 39 to 41, wherein the tunnel aggregates traffic associated with: a plurality of bearers associated with the child wireless node, a plurality of bearers associated with a plurality of child wireless nodes.

Aspect 43: The method of any of Aspects 39 to 42, further comprising: receiving quality of service information associated with enabling communication of traffic via the second connection and the second base station; and wherein forwarding the at least the portion of the user-plane traffic comprises: forwarding the portion of the user-plane traffic based at least in part on the quality of service information.

Aspect 44: The method of any of Aspects 38 to 43, wherein the first base station is a donor of the wireless node and the second base station is not a donor of the wireless node.

Aspect 45: The method of any of Aspects 38 to 44, wherein at least one of the first base station or the second base station is a primary node of the wireless node and the other of the first base station or the second base station is a secondary node of the wireless node.

Aspect 46: The method of any of Aspects 38 to 45, wherein the wireless node is connected to the first base station and the second base station via a single cell group.

Aspect 47: The method of any of Aspects 38 to 46, wherein the wireless node is connected to the first base station via a first cell group and is connected to the second base station via a second cell group.

Aspect 48: The method of any of Aspects 38 to 47, wherein the child wireless node is a user equipment or a mobile terminal.

Aspect 49: The method of any of Aspects 38 to 48, wherein the portion of the user-plane traffic is at least one of: traffic associated with an F1-U general packet radio service (GPRS) tunneling protocol (GTP-U) tunnel of a child data bearer, Internet protocol (IP) traffic associated with the F1-U GTP-U tunnel, uplink traffic, or downlink traffic.

Aspect 50: The method of any of Aspects 38 to 49, wherein the portion of the user-plane traffic is conveyed via a Uu link to the second base station and mapped to an access radio link control (RLC) channel associated with the second connection between the child wireless node and the second base station.

Aspect 51: The method of any of Aspects 38 to 50, wherein the portion of the user-plane traffic is conveyed via a backhaul (BH) radio link control (RLC) channel associated with the second connection between the child wireless node and the second base station.

Aspect 52: The method of Aspect 51, wherein a configuration of the BH RLC channel is at least one of: configured at the wireless node, provided to the first base station, or includes a mapping configuration.

Aspect 53: The method of any of Aspects 38 to 52, further comprising: transmitting address information for forwarding of the user-plane traffic between the wireless node and the first base station, wherein the address information is specific to the portion of the user-plane traffic or a path for communicating the user-plane traffic.

Aspect 54: The method of any of Aspects 38 to 53, further comprising: receiving information identifying a capability of the wireless node for forwarding user-plane traffic; and wherein forwarding the user-plane traffic comprises: forwarding the user-plane traffic based at least in part on receiving the information identifying the capability.

Aspect 55: The method of Aspect 54, wherein the capability is a frequency-dependent capability.

Aspect 56: An apparatus for wireless communication at a device, comprising a processor; memory coupled with the processor; and instructions stored in the memory and executable by the processor to cause the apparatus to perform the method of one or more Aspects of Aspects 1-17.

Aspect 57: A device for wireless communication, comprising a memory and one or more processors coupled to the memory, the memory and the one or more processors configured to perform the method of one or more Aspects of Aspects 1-17.

Aspect 58: An apparatus for wireless communication, comprising at least one means for performing the method of one or more Aspects of Aspects 1-17.

Aspect 59: A non-transitory computer-readable medium storing code for wireless communication, the code comprising instructions executable by a processor to perform the method of one or more Aspects of Aspects 1-17.

Aspect 60: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 61: An apparatus for wireless communication at a device, comprising a processor; memory coupled with the processor; and instructions stored in the memory and executable by the processor to cause the apparatus to perform the method of one or more Aspects of Aspects 18-37.

Aspect 62: A device for wireless communication, comprising a memory and one or more processors coupled to the memory, the memory and the one or more processors configured to perform the method of one or more Aspects of Aspects 18-37.

Aspect 63: An apparatus for wireless communication, comprising at least one means for performing the method of one or more Aspects of Aspects 18-37.

Aspect 64: A non-transitory computer-readable medium storing code for wireless communication, the code comprising instructions executable by a processor to perform the method of one or more Aspects of Aspects 18-37.

Aspect 65: A non-transitory computer-readable medium storing a set of instructions for wireless communication, the set of instructions comprising one or more instructions that, when executed by one or more processors of a device, cause the device to perform the method of one or more Aspects of Aspects 18-37.

Aspect 66: An apparatus for wireless communication at a device, comprising a processor; memory coupled with the processor; and instructions stored in the memory and executable by the processor to cause the apparatus to perform the method of one or more Aspects of Aspects 38-55.

Aspect 67: A device for wireless communication, comprising a memory and one or more processors coupled to the memory, the memory and the one or more processors configured to perform the method of one or more Aspects of Aspects 38-55.

Aspect 68: An apparatus for wireless communication, comprising at least one means for performing the method of one or more Aspects of Aspects 38-55.

Aspect 69: A non-transitory computer-readable medium storing code for wireless communication, the code comprising instructions executable by a processor to perform the method of one or more Aspects of Aspects 38-55.

Aspect 70: A non-transitory computer-readable medium storing a set of instructions for wireless communication, the set of instructions comprising one or more instructions that, when executed by one or more processors of a device, cause the device to perform the method of one or more Aspects of Aspects 38-55.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
   a memory; and
   one or more processors, coupled to the memory, configured to:
   receive path information indicating an F1-U direct path and an F1-U alternative path, the path information identifying a child wireless node or a bearer established for the child wireless node;
   establish, based on the path information, a first connection between the child wireless node and a first base station and a second connection between the child wireless node and the first base station via a second base station, wherein the first connection is the F1-U direct path and the second connection is the F1-U alternative path, the path information enabling the wireless node to map user-plane traffic onto the F1-U direct path or the F1-U alternative path; and
   forward at least a portion of the user-plane traffic between the child wireless node and the first base station via the second connection and the second base station.

2. The wireless node of claim 1, wherein the first base station is a donor of the wireless node and the second base station is not a donor of the wireless node.

3. The wireless node of claim 1, wherein the one or more processors are further configured to:
   detect a satisfaction of a switching condition associated with a network; and
   switch, based at least in part on detecting the satisfaction of the switching condition, to forwarding at least another portion of the user-plane traffic between the child wireless node and the first base station via the first connection.

4. The wireless node of claim 3, wherein the switching condition is at least one of: an energy utilization condition or a load balancing condition.

5. The wireless node of claim 1, wherein at least one of the first base station or the second base station is a primary node of the wireless node and the other of the first base station or the second base station is a secondary node of the wireless node.

6. The wireless node of claim 1, wherein the one or more processors are further configured to:
   transmit information identifying a capability of the wireless node for forwarding user-plane traffic; and
   wherein the one or more processors, to forward the user-plane traffic, are configured to:
   forward the user-plane traffic based at least in part on transmitting the information identifying the capability.

7. The wireless node of claim 6, wherein the capability is a frequency-dependent capability.

8. A first base station for wireless communication, comprising:
   a memory; and
   one or more processors, coupled to the memory, configured to:
   transmit path information indicating an F1-U direct path and an F1-U alternative path, the path information identifying a child wireless node or a bearer established for the child wireless node;

establish, based on the path information, a first connection to the child wireless node via a wireless node and a second connection to the child wireless node via a second base station and the wireless node, wherein the first connection is the F1-U direct path and the second connection is the F1-U alternative path, the path information enabling the wireless node to map user-plane traffic onto the F1-U direct path or the F1-U alternative path; and communicate at least a portion of the user-plane traffic with the child wireless node via the second connection, the wireless node, and the second base station.

9. The first base station of claim 8, wherein the first base station and the second base station are connected via a configured tunnel.

10. The first base station of claim 9, wherein the configured tunnel is associated with a base station interface, the base station interface comprising an Xn interface or an X2 interface.

11. The first base station of claim 9, wherein the configured tunnel is associated with transporting integrated access and backhauling mobile terminal-associated traffic.

12. The first base station of claim 9, wherein the configured tunnel aggregates traffic associated with:
   a plurality of bearers associated with the child wireless node, or
   a plurality of bearers associated with a plurality of child wireless nodes.

13. The first base station of claim 9, wherein the one or more processors are further configured to:
   provide quality of service information associated with enabling communication of traffic via the second connection and the second base station.

14. The first base station of claim 8, wherein the wireless node is connected to the first base station via a first cell group and is connected to the second base station via a second cell group.

15. The first base station of claim 8, wherein the one or more processors are further configured to:
   transmit address information for forwarding of the user-plane traffic between the wireless node and the first base station, wherein the address information is specific to the portion of the user-plane traffic or a path for communicating the user-plane traffic.

16. The first base station of claim 8, wherein the one or more processors are further configured to:
   receive information identifying a capability of the wireless node for forwarding user-plane traffic; and
   wherein the one or more processors, to communicate the user-plane traffic, are configured to:
      communicate the user-plane traffic based at least in part on receiving the information identifying the capability.

17. The first base station of claim 16, wherein the capability is a frequency-dependent capability.

18. A second base station for wireless communication, comprising:
   a memory; and
   one or more processors, coupled to the memory, configured to:
      transmit path information indicating an F1-U direct path and an F1-U alternative path, the path information identifying a child wireless node or a bearer established for the child wireless node;
      establish a second connection between a first base station and the child wireless node via a wireless node, wherein the child wireless node is associated with a first connection to the first base station via the wireless node, and wherein the first connection is the F1-U direct path and the second connection is the F1-U alternative path, the path information enabling the wireless node to map user-plane traffic onto the F1-U direct path or the F1-U alternative path; and
      forward at least a portion of the user-plane traffic between the first base station and the child wireless node via the second connection and the wireless node.

19. The second base station of claim 18, wherein the first base station and the second base station are connected via a configured tunnel.

20. The second base station of claim 19, wherein the configured tunnel is associated with a base station interface, the base station interface comprising an Xn interface or an X2 interface.

21. The second base station of claim 19, wherein the configured tunnel is associated with transporting integrated access and backhauling mobile terminal-associated traffic.

22. The second base station of claim 19, wherein the configured tunnel aggregates traffic associated with:
   a plurality of bearers associated with the child wireless node, or
   a plurality of bearers associated with a plurality of child wireless nodes.

23. The second base station of claim 19, wherein the one or more processors are further configured to:
   receive quality of service information associated with enabling communication of traffic via the second connection and the second base station; and
   wherein the one or more processors, to forward the at least the portion of the user-plane traffic, are configured to:
      forward the portion of the user-plane traffic based at least in part on the quality of service information.

24. The second base station of claim 18, wherein the first base station is a donor of the wireless node and the second base station is not a donor of the wireless node.

25. The second base station of claim 18, wherein at least one of the first base station or the second base station is a primary node of the wireless node and the other of the first base station or the second base station is a secondary node of the wireless node.

26. The second base station of claim 18, wherein the wireless node is connected to the first base station and the second base station via a single cell group.

27. The second base station of claim 18, wherein the wireless node is connected to the first base station via a first cell group and is connected to the second base station via a second cell group.

28. The second base station of claim 18, wherein the one or more processors are further configured to:
   transmit address information for forwarding of the user-plane traffic between the wireless node and the first base station, wherein the address information is specific to the portion of the user-plane traffic or a path for communicating the user-plane traffic.

29. A method of wireless communication performed by a wireless node, comprising:
   receiving path information indicating an F1-U direct path and an F1-U alternative path, the path information identifying a child wireless node or a bearer established for the child wireless node;
   establishing, based on the path information, a first connection between the child wireless node and a first base station and a second connection between the child wireless node and the first base station via a second base station, wherein the first connection is the F1-U direct path and the second connection is the F1-U alternative path, the path information enabling the wireless node to map user-plane traffic onto the F1-U direct path or the F1-U alternative path; and forwarding at least a portion of the user-plane traffic between the child wireless node and the first base station via the second connection and the second base station.

30. The method of claim 29, further comprising:

detecting a satisfaction of a switching condition associated with a network; and switching, based at least in part on detecting the satisfaction of the switching condition, to forwarding at least another portion of the user-plane traffic between the child wireless node and the first base station via the first connection.

* * * * *